(12) United States Patent
Brown et al.

(10) Patent No.: US 8,275,803 B2
(45) Date of Patent: Sep. 25, 2012

(54) SYSTEM AND METHOD FOR PROVIDING ANSWERS TO QUESTIONS

(75) Inventors: Eric W. Brown, New Fairfield, CT (US); David Ferrucci, Yorktown Heights, NY (US); Adam Lally, Cold Spring, NY (US); Wlodek W. Zadrozny, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 547 days.

(21) Appl. No.: 12/152,411

(22) Filed: May 14, 2008

(65) Prior Publication Data
US 2009/0287678 A1    Nov. 19, 2009

(51) Int. Cl.
*G06F 17/30* (2006.01)
*G06Q 30/00* (2012.01)

(52) U.S. Cl. ...................................... 707/802; 705/14.44
(58) Field of Classification Search .................. None
See application file for complete search history.

(56) References Cited

U.S. PATENT DOCUMENTS

| | | |
|---|---|---|
| 3,559,995 A | 2/1971 | Steadman |
| 4,594,686 A | 6/1986 | Yoshida |
| 4,599,691 A | 7/1986 | Sakaki et al. |
| 4,829,423 A | 5/1989 | Tennant et al. |
| 4,921,427 A | 5/1990 | Dunn |
| 5,384,894 A | 1/1995 | Vassiliadis et al. |
| 5,414,797 A | 5/1995 | Vassiliadis et al. |
| 5,513,116 A | 4/1996 | Buckley et al. |
| 5,546,316 A | 8/1996 | Buckley et al. |
| 5,550,746 A | 8/1996 | Jacobs |
| 5,559,714 A | 9/1996 | Banks et al. |
| 5,677,993 A | 10/1997 | Ohga et al. |

(Continued)

FOREIGN PATENT DOCUMENTS

EP    0 513 638    11/1992

(Continued)

OTHER PUBLICATIONS

Jeongwoo et al, "Language-independent Probabilistic Answer Ranking for Question Answering", Jun. 1, 2007.*

(Continued)

*Primary Examiner* — Tarek Chbouki
(74) *Attorney, Agent, or Firm* — Scully, Scott, Murphy & Presser, P.C.; William Stock, Esq.

(57) ABSTRACT

A system, method and computer program product for providing answers to questions based on any corpus of data. The method facilitates generating a number of candidate passages from the corpus that answer an input query, and finds the correct resulting answer by collecting supporting evidence from the multiple passages. By analyzing all retrieved passages and that passage's metadata in parallel, there is generated an output plurality of data structures including candidate answers based upon the analyzing. Then, by each of a plurality of parallel operating modules, supporting passage retrieval operations are performed upon the set of candidate answers, and for each candidate answer, the data corpus is traversed to find those passages having candidate answer in addition to query terms. All candidate answers are automatically scored causing the supporting passages by a plurality of scoring modules, each producing a module score. The modules scores are processed to determine one or more query answers; and, a query response is generated for delivery to a user based on the one or more query answers.

25 Claims, 6 Drawing Sheets

U.S. PATENT DOCUMENTS

| | | | |
|---|---|---|---|
| 5,726,898 A | 3/1998 | Jacobs | |
| 5,768,142 A | 6/1998 | Jacobs | |
| 5,873,056 A | 2/1999 | Liddy et al. | |
| 5,875,110 A | 2/1999 | Jacobs | |
| 6,275,788 B1 | 8/2001 | Watanabe et al. | |
| 6,336,029 B1 | 1/2002 | Ho et al. | |
| 6,480,698 B2 | 11/2002 | Ho et al. | |
| 6,487,545 B1 | 11/2002 | Wical | |
| 6,498,921 B1 | 12/2002 | Ho et al. | |
| 6,501,937 B1 | 12/2002 | Ho et al. | |
| 6,571,240 B1 | 5/2003 | Ho et al. | |
| 6,584,464 B1 | 6/2003 | Warthen | |
| 6,584,470 B2 | 6/2003 | Veale | |
| 6,631,377 B2 | 10/2003 | Kuzumaki | |
| 6,665,666 B1 | 12/2003 | Brown et al. | |
| 6,701,322 B1 | 3/2004 | Green | |
| 6,732,090 B2 | 5/2004 | Shanahan et al. | |
| 6,778,979 B2 | 8/2004 | Grefenstette et al. | |
| 6,816,858 B1 | 11/2004 | Coden et al. | |
| 6,820,075 B2 | 11/2004 | Shanahan et al. | |
| 6,829,603 B1 | 12/2004 | Chai et al. | |
| 6,829,605 B2 | 12/2004 | Azzam | |
| 6,859,800 B1 | 2/2005 | Roche et al. | |
| 6,865,370 B2 | 3/2005 | Ho et al. | |
| 6,928,425 B2 | 8/2005 | Grefenstette et al. | |
| 6,928,432 B2 | 8/2005 | Fagan et al. | |
| 6,947,885 B2 | 9/2005 | Bangalore et al. | |
| 6,957,213 B1 | 10/2005 | Yuret | |
| 6,983,252 B2 | 1/2006 | Matheson et al. | |
| 6,993,517 B2 | 1/2006 | Naito et al. | |
| 7,007,104 B1 | 2/2006 | Lewis et al. | |
| 7,031,951 B2 | 4/2006 | Mancisidor et al. | |
| 7,051,014 B2 | 5/2006 | Brill et al. | |
| 7,054,803 B2 | 5/2006 | Eisele | |
| 7,058,564 B2 | 6/2006 | Ejerhed | |
| 7,117,432 B1 | 10/2006 | Shanahan et al. | |
| 7,120,574 B2 | 10/2006 | Troyanova et al. | |
| 7,133,862 B2 | 11/2006 | Hubert et al. | |
| 7,136,909 B2 | 11/2006 | Balasuriya | |
| 7,139,752 B2 | 11/2006 | Broder et al. | |
| 7,149,732 B2 | 12/2006 | Wen et al. | |
| 7,152,057 B2 | 12/2006 | Brill et al. | |
| 7,171,351 B2 | 1/2007 | Zhou | |
| 7,177,798 B2 | 2/2007 | Hsu et al. | |
| 7,194,455 B2 | 3/2007 | Zhou et al. | |
| 7,197,739 B2 | 3/2007 | Preston et al. | |
| 7,206,780 B2 | 4/2007 | Slackman | |
| 7,209,923 B1 | 4/2007 | Cooper | |
| 7,216,073 B2 | 5/2007 | Lavi et al. | |
| 7,236,968 B2 | 6/2007 | Seki et al. | |
| 7,246,087 B1 | 7/2007 | Ruppelt et al. | |
| 7,249,127 B2 | 7/2007 | Azzam | |
| 7,266,537 B2 | 9/2007 | Jacobsen et al. | |
| 7,269,545 B2 | 9/2007 | Agichtein et al. | |
| 7,293,015 B2 | 11/2007 | Zhou | |
| 7,299,228 B2 | 11/2007 | Cao et al. | |
| 7,313,515 B2 | 12/2007 | Crouch et al. | |
| 7,519,529 B1* | 4/2009 | Horvitz | 704/7 |
| 2001/0032211 A1 | 10/2001 | Kuzumaki | |
| 2001/0053968 A1 | 12/2001 | Galitsky et al. | |
| 2003/0033287 A1 | 2/2003 | Shanahan et al. | |
| 2003/0220890 A1 | 11/2003 | Okude | |
| 2004/0049499 A1 | 3/2004 | Nomoto et al. | |
| 2004/0064305 A1 | 4/2004 | Sakai | |
| 2004/0122660 A1 | 6/2004 | Cheng et al. | |
| 2004/0243645 A1 | 12/2004 | Broder et al. | |
| 2004/0254917 A1 | 12/2004 | Brill et al. | |
| 2005/0033711 A1 | 2/2005 | Horvitz et al. | |
| 2005/0050037 A1* | 3/2005 | Frieder et al. | 707/3 |
| 2005/0060301 A1 | 3/2005 | Seki et al. | |
| 2005/0086045 A1 | 4/2005 | Murata | |
| 2005/0086222 A1 | 4/2005 | Wang et al. | |
| 2005/0114327 A1 | 5/2005 | Kumamoto et al. | |
| 2005/0143999 A1 | 6/2005 | Ichimura | |
| 2005/0256700 A1* | 11/2005 | Moldovan et al. | 704/9 |
| 2006/0053000 A1 | 3/2006 | Moldovan et al. | |
| 2006/0106788 A1 | 5/2006 | Forrest | |
| 2006/0122834 A1 | 6/2006 | Bennett | |
| 2006/0141438 A1 | 6/2006 | Chang et al. | |
| 2006/0173834 A1 | 8/2006 | Brill et al. | |
| 2006/0204945 A1 | 9/2006 | Masuichi et al. | |
| 2006/0206472 A1 | 9/2006 | Masuichi et al. | |
| 2006/0206481 A1 | 9/2006 | Ohkuma et al. | |
| 2006/0235689 A1 | 10/2006 | Sugihara et al. | |
| 2006/0277165 A1 | 12/2006 | Yoshimura et al. | |
| 2006/0282414 A1 | 12/2006 | Sugihara et al. | |
| 2006/0294037 A1 | 12/2006 | Horvitz et al. | |
| 2007/0022099 A1* | 1/2007 | Yoshimura et al. | 707/3 |
| 2007/0022109 A1 | 1/2007 | Imielinski et al. | |
| 2007/0073683 A1 | 3/2007 | Kobayashi et al. | |
| 2007/0078842 A1 | 4/2007 | Zola et al. | |
| 2007/0094183 A1 | 4/2007 | Paek et al. | |
| 2007/0094285 A1 | 4/2007 | Agichtein et al. | |
| 2007/0118519 A1 | 5/2007 | Yamasawa et al. | |
| 2007/0124291 A1 | 5/2007 | Hassan et al. | |
| 2007/0136246 A1 | 6/2007 | Stenchikova et al. | |
| 2007/0196804 A1 | 8/2007 | Yoshimura et al. | |
| 2007/0203863 A1 | 8/2007 | Gupta et al. | |
| 2009/0070311 A1* | 3/2009 | Feng | 707/5 |
| 2009/0112828 A1* | 4/2009 | Rozenblatt | 707/4 |
| 2009/0192966 A1 | 7/2009 | Horvitz et al. | |
| 2010/0100546 A1* | 4/2010 | Kohler | 707/739 |

FOREIGN PATENT DOCUMENTS

| | | |
|---|---|---|
| EP | 1 284 461 | 2/2003 |
| EP | 1 391 834 | 2/2004 |
| EP | 1 653 379 | 5/2006 |
| EP | 1 793 318 | 5/2008 |
| WO | WO 2006/042028 | 4/2006 |

OTHER PUBLICATIONS

Ittycheriah, A. et al, entitled "{IBM}'s Statistical Question Answering System—{TREC}—"Text {REtrieval} Conference in 2001 at ttp://citeseer.ist.psu.edu/cache/papers/cs2/7/http:zSzzSztrec.nist.govzSzpubszSztrec10zSz.zSzpaperszSztrec2001.pdf/ittycheriah01ibms.pdf).

Pasca, "Question-Driven Semantic Filters for Answer Retrieval" International Journal of Pattern Recognition and Artificial Intelligence (IJPRAI), World Scientific Publishing, SI, vol. 17, No. 5, Aug. 1, 2003, pp. 741-756.

Cucerzan et al., "Factoid Question Answering over Unstructured and Structured Web Content", in Proceedings of the 14th Text Retrieval Conference TREC 2005, Dec. 31, 2005.

Molla et al., "AnswerFinder at TREC 2004", Proceedings of teh 13th Text Retrieval Conference TREC 2004, Dec. 31, 2004.

"Question Answering", Wikipedia, the free encyclopedia, http://en.wikipedia.org/wiki/Question_answering, last printed May 20, 2008.

Gotz et al., "Design and implementation of teh UIM, Analysis System", IBM Systems Journal, vol. 43, No. 3, 2004, http://www.research.ibm.com/journal/sj/433/gotz.html, last printed May 20, 2008, pp. 1-13.

Bontcheva et al., "Shallow Methods for Named Entity Coreference Resolution", TALN 2002, Nancy, Jun. 24-27, 2002.

* cited by examiner

SYSTEM AND METHOD FOR PROVIDING ANSWERS TO QUESTIONS

BACKGROUND

1. Field of the Invention

The invention relates generally to information retrieval systems, and more particularly, the invention relates to a novel query/answer system and method implementing a degree of parallel analysis for providing answers to questions based on generating and quickly evaluating many candidate answers.

2. Description of the Related Art

An introduction to the current issues and approaches of Questions Answering (QA) can be found in the web-based reference http://en.wikipedia.org/wiki/Question_answering. Generally, question answering is a type of information retrieval. Given a collection of documents (such as the World Wide Web or a local collection) the system should be able to retrieve answers to questions posed in natural language. QA is regarded as requiring more complex natural language processing (NLP) techniques than other types of information retrieval such as document retrieval, and it is sometimes regarded as the next step beyond search engines.

QA research attempts to deal with a wide range of question types including: fact, list, definition, How, Why, hypothetical, semantically-constrained, and cross-lingual questions. Search collections vary from small local document collections, to internal organization documents, to compiled newswire reports, to the world wide web.

Closed-domain question answering deals with questions under a specific domain (for example, medicine or automotive maintenance), and can be seen as an easier task because NLP systems can exploit domain-specific knowledge frequently formalized in ontologies. Open-domain question answering deals with questions about nearly everything, and can only rely on general ontologies and world knowledge. On the other hand, these systems usually have much more data available from which to extract the answer.

Alternatively, closed-domain might refer to a situation where only a limited type of questions are accepted, such as questions asking for descriptive rather than procedural information.

Access to information is currently dominated by two paradigms: a database query that answers questions about what is in a collection of structured records; and, a search that delivers a collection of document links in response to a query against a collection of unstructured data (text, html etc.).

One major unsolved problem in such information query paradigms is the lack of a computer program capable of answering factual questions based on information included in a large collection of documents (of all kinds, structured and unstructured). Such questions can range from broad such as "what are the risk of vitamin K deficiency" to narrow such as "when and where was Hillary Clinton's father born".

User interaction with such a computer program could be either single user-computer exchange or multiple turn dialog between the user and the computer system. Such dialog can involve one or multiple modalities (text, voice, tactile, gesture etc.). Examples of such interaction include a situation where a cell phone user is asking a question using voice and is receiving an answer in a combination of voice, text and image (e.g. a map with a textual overlay and spoken (computer generated) explanation. Another example would be a user interacting with a video game and dismissing or accepting an answer using machine recognizable gestures or the computer generating tactile output to direct the user.

The challenge in building such a system is to understand the query, to find appropriate documents that might contain the answer, and to extract the correct answer to be delivered to the user. Currently, understanding the query is an open problem because computers do not have human ability to understand natural language nor do they have common sense to choose from many possible interpretations that current (very elementary) natural language understanding systems can produce.

In the patent literature, U.S. Patent Publication Nos. 20070203863A1, U.S.20070196804A1, U.S. Pat. No. 7,236,968 and EP Patent No. 1797509A2 describe generally the state of the art in QA technology.

U.S. Patent Pub. No. 2007/0203863A1 entitled "Meta learning for question classification" describes a system and a method are disclosed for automatic question classification and answering. A multipart artificial neural network (ANN) comprising a main ANN and an auxiliary ANN classifies a received question according to one of a plurality of defined categories. Unlabeled data is received from a source, such as a plurality of human volunteers. The unlabeled data comprises additional questions that might be asked of an autonomous machine such as a humanoid robot, and is used to train the auxiliary ANN in an unsupervised mode. The unsupervised training can comprise multiple auxiliary tasks that generate labeled data from the unlabeled data, thereby learning an underlying structure. Once the auxiliary ANN has trained, the weights are frozen and transferred to the main ANN. The main ANN can then be trained using labeled questions. The original question to be answered is applied to the trained main ANN, which assigns one of the defined categories. The assigned category is used to map the original question to a database that most likely contains the appropriate answer. An object and/or a property within the original question can be identified and used to formulate a query, using, for example, system query language (SQL), to search for the answer within the chosen database. The invention makes efficient use of available information, and improves training time and error rate relative to use of single part ANNs.

U.S. Patent Publication No. 2007/0196804A1 entitled "Question-answering system, question-answering method, and question-answering program" describes a question-answering system that is formed with an information processing apparatus for processing information in accordance with a program, and obtains an answer to an input search question sentence by searching a knowledge source, includes: a background information set; a first answer candidate extracting unit; a first background information generating unit; an accuracy determining unit; and a first background information adding unit.

U.S. Pat. No. 7,236,968 entitled "Question-answering method and question-answering apparatus" describes a question document is divided into predetermined areas, and it is judged whether each divided area is important, to thereby extract an important area. A reply example candidate likelihood value is calculated for each important area, the likelihood value indicating the degree representative of whether each reply example candidate corresponds to a question content. By using the reply example candidate likelihood value, important areas having similar meanings are combined to extract final important parts. A reply example candidate is selected for each important part from reply example candidates prepared beforehand. A reply example candidate reliability degree representative of certainty of each reply example candidate and a reply composition degree indicating whether it is necessary to compose a new reply are calculated, and by using these values, question documents are distributed to different operator terminals.

U.S. Pat. No. 7,216,073 provides a reference to parallel processing in question answering using natural language in addition to a comprehensive summary of prior art.

In the patent literature, U.S. Pat. No. 7,293,015 describes a method for retrieving answers to questions from an information retrieval system. The method involves automatically learning phrase features for classifying questions into different types, automatically generating candidate query transformations from a training set of question/answer pairs, and automatically evaluating the candidate transforms on information retrieval systems. At run time, questions are transformed into a set of queries, and re-ranking is performed on the documents retrieved.

In the patent literature, U.S. Pat. No. 7,313,515 describes techniques for detecting entailment and contradiction. Packed knowledge representations for a premise and conclusion text are determined comprising facts about the relationships between concept and/or context denoting terms. Concept and context alignments are performed based on alignments scores. A union is determined. Terms are marked as to their origin and conclusion text terms replaced with by corresponding terms from the premise text. Subsumption and specificity, instantiability, spatio-temporal and relationship based packed rewrite rules are applied in conjunction with the context denoting facts to remove entailed terms and to mark contradictory facts within the union. Entailment is indicated by a lack of any facts from the packed knowledge representation of the conclusion in the union. Entailment and contradiction markers are then displayed.

U.S. Pat. No. 7,299,228 describes a technique for extracting information from an information source. During extraction, strings in the information source are accessed. These strings in the information source are matched with generalized extraction patterns that include words and wildcards. The wildcards denote that at least one word in an individual string can be skipped in order to match the individual string to an individual generalized extraction pattern.

U.S. Pat. No. 6,665,666 describes a technique for answering factoid questions based on patterns and question templates, and utilizing a search process over a repository of unstructured data (text).

Methods of generating automatically natural language expressions from a formal representation have been previously disclosed, for example, in the U.S. Pat. Nos. 5,237,502 and 6,947,885.

U.S. Pat. Nos. 6,829,603 and 6,983,252 teach how an interactive dialog system using a dialog manager module maintains and directs interactive sessions between each of the users and the computer system and how to provide a mechanism for providing mixed-initiative control for such systems. A mixed initiative approach is where the user is not constrained to answer the system's direct questions but may answer in a less rigid/structured manner. U.S. Pat. No. 7,136,909 teaches how the interactive dialog systems can be extended to multimodal communication for accessing information and service, with the interaction involving multiple modalities of text, audio, video, gesture, tactile input and output, etc.

Being able to answer factual query in one or multiple dialog turns is of potential great value for the society as it enables real time access to accurate information. Similarly, advancing the state of the art in question answering has great business value, since it provides a real time view of the business, its competitors, economic conditions, etc. Even if it is in a most elementary form, it can improve productivity of information workers by orders of magnitude.

It would be highly desirable to provide a computing infrastructure and methodology for conducting questions and answers.

SUMMARY OF THE INVENTION

The present invention addresses the needs described above by providing a dynamic infrastructure and methodology for conducting questions and answers. The infrastructure can be used as part of a larger interactive dialog system where the question or questions are answered in multiple turns and where session information is kept by the system as part of the context.

In accordance with the invention, the infrastructure and methodology for conducting questions answering generates a large number of candidate passages that may contain an answer to the question, and tries to find the correct answer by collecting supporting evidence for a large set of candidate answers based on an analysis including these multiple passages. A passage is a fragment of a document, or the whole document.

In one example embodiment, a collection of documents is searched with one or more query terms and a collection of candidate answers is generated from titles of retrieved documents and entities mentioned in these documents. Semi-structured, "title oriented" sources such as encyclopedias, dictionaries, intelligence sources, business documents, and web pages (with headers information preserved) are good sources of such documents. Such sources can also be created by the system itself by mining unstructured data and putting collection of titles on such mined lists. In a subsequent step, in one embodiment, another search is performed; this time, candidate answers are added to query terms. New sets of passages (documents) are retrieved. Based on an analysis of the candidate answers and retrieved documents, one or more best answers are produced.

Thus, in one aspect of the invention there is provided a computer-implemented method of generating answers to questions based on any corpus of data in a system, the computer-implemented method comprising:

receiving an input query and perform query context analysis function to break down all query into query terms, all query terms comprising both searchable and non-searchable components;

utilizing all searchable components and conducting a search in any corpus of data including structured and unstructured data to obtain passages potentially including candidate answers, all passages potentially including candidate answers being stored in a data storage device;

analyzing all retrieved passages and that passage's metadata, in a candidate answer generation module, to generate an output plurality of data structures including candidate answers based upon the analyzing;

performing, by each of a plurality of parallel operating modules, supporting passage retrieval operation upon all upon the set of candidate answers, and for each candidate answer, traversing the data corpus and the data storage device to find those passages having candidate answer in addition to query terms;

automatically scoring all candidate answers using the supporting passages by a plurality of scoring modules, each producing a module score;

applying a candidate answer ranking function to the modules scores to determine one or more query answers; and, generating a query response based on the one or more query answers for delivery to a user.

In a further aspect of the invention, there is provided a system for generating answers to questions based on any corpus of data comprising:

a query analysis means for receiving an input query and performing query context analysis function to break down the input query into query terms, all query terms comprising both searchable and non-searchable components;

a candidate answer generating means utilizing all searchable components and conducting a search in any corpus of data including structured and unstructured data to obtain passages potentially including candidate answers, a data storage device for storing the obtained passages potentially including the candidate answers;

means for analyzing all retrieved passages and that passage's metadata to generate an output plurality of data structures including candidate answers based upon the analyzing;

a plurality of parallel operating means each for performing supporting passage retrieval operation upon the set of candidate answers, and for each candidate answer, traversing the data corpus and the data storage device to find those passages having candidate answer in addition to query terms;

a plurality of scoring modules each for automatically scoring all candidate answers using the supporting passages and producing a module score; and, a means for applying a candidate answer ranking function to the modules scores to determine one or more query answers, and, for generating a query response based on the one or more query answers for delivery to a user.

Further to this aspect of the invention, the input query or the query response or both the input query and query response is provided in accordance with one or more of multiple modalities including text, audio, image, video, tactile or gesture.

Moreover, in the system, the query analysis means includes:

a means for determining, from the query, one or more predicate argument structures for each input query; and, a means for determining, from the query, one or more lexical answer types for each input query.

Furthermore, in the system, the query analysis means generates a first plurality of data structures each comprising the query terms including the searchable components, the system further including:

a first splitter means for initiating a parallel search for candidate answers by distributing the first plurality of data structures to enable concurrent search results processing providing the candidate answers.

Furthermore, as the candidate answer generating means generates a second plurality of data structures each comprising candidate answer sets, the system further includes:

a second splitter means for splitting the candidate answer sets into separate data structures each including one or more candidate answers, and providing the data structures to the plurality of parallel operating means performing concurrent parallel supporting passage retrieval operations.

Furthermore, as each the plurality of scoring modules automatically provides scoring of all candidate answers using the supporting passages, the system further comprises:

a means for conducting, in parallel, one or more analyses, each producing a score, wherein one score comprises a term match score obtained by implementing executable instructions for counting the number of terms in the supporting passage and determining if the number matches a number of terms in a candidate answer; and, wherein a further score comprises a textual alignment score obtained by implementing executable instructions for determining if placement of words in the supporting passages are in alignment with placement of words of the candidate answers; and, wherein a further score comprises a deeper analysis score obtained by implementing executable instructions for determining the meaning of the supporting passages and input queries by analyzing lexical or semantic relations.

In yet a further aspect of the invention, there is provided a program storage device readable by a machine, tangibly embodying a program of instructions executable by the machine to perform method steps for generating answers to questions based on any corpus of data, the method steps including the steps of:

receiving an input query and performing query context analysis upon the query to break down the input query into query terms, all query terms comprising both searchable and non-searchable components;

utilizing all searchable components and conducting a search in any corpus of data including structured and unstructured data to obtain passages potentially including candidate answers, all passages potentially including candidate answers being stored in a data storage device;

analyzing all retrieved passages and that passage's metadata, in a candidate answer generation module, to generate an output plurality of data structures including candidate answers based upon the analyzing;

performing, by each of a plurality of parallel operating modules, supporting passage retrieval operation upon the set of candidate answers, and for each candidate answer, traversing the data corpus and the data storage device to find those passages having candidate answer in addition to query terms;

automatically scoring all candidate answers using the supporting passages by a plurality of scoring modules, each producing a module score;

applying a candidate answer ranking function to the modules scores to determine one or more query answers; and, generating a query response based on the one or more query answers for delivery to a user.

In still yet another aspect of the invention, there is provided a method of deploying a computer program product for generating answers to questions based on any corpus of data, wherein, when executed, the computer program performs the steps of:

receiving an input query and performing query context analysis upon the query to break down the input query into query terms, all query terms comprising both searchable and non-searchable components;

utilizing all searchable components and conducting a search in any corpus of data including structured and unstructured data to obtain passages potentially including candidate answers, all passages potentially including candidate answers being stored in a data storage device;

analyzing all retrieved passages and that passage's metadata, in a candidate answer generation module, to generate an output plurality of data structures including candidate answers based upon the analyzing;

performing, by each of a plurality of parallel operating modules, supporting passage retrieval operation upon the set of candidate answers, and for each candidate answer, traversing the data corpus and the data storage device to find those passages having candidate answer in addition to query terms;

automatically scoring all candidate answers using the supporting passages by a plurality of scoring modules, each producing a module score;

applying a candidate answer ranking function to the modules scores to determine one or more query answers; and, generating a query response based on the one or more query answers for delivery to a user.

Thus, advantageously, the present invention may be deployed as a question/answering service in conjunction with, for instance, a search engine.

BRIEF DESCRIPTION OF THE DRAWINGS

The objects, features and advantages of the invention are understood within the context of the Description of the Preferred Embodiment, as set forth below. The Description of the Preferred Embodiment is understood within the context of the accompanying drawings, which form a material part of this disclosure, wherein.

DETAILED DESCRIPTION OF THE PREFERRED EMBODIMENTS

As will be referred to herein, the word "question" and "query," and their extensions, are used interchangeably and refer to the same concept, namely request for information. Such requests are typically expressed in an interrogative sentence, but they can also be expressed in other forms, for example as a declarative sentence providing a description of an entity of interest (where the request for the identification of the entity can be inferred from the context). "Structured information" (from "structured information sources") is defined herein as information whose intended meaning is unambiguous and explicitly represented in the structure or format of the data (e.g., a database table). "Unstructured information" (from "unstructured information sources") is defined herein as information whose intended meaning is only implied by its content (e.g., a natural language document). By "Semi structured" it is meant data having some of the meaning explicitly represented in the format of the data, for example a portion of the document can be tagged as a "title".

Figure 1A:
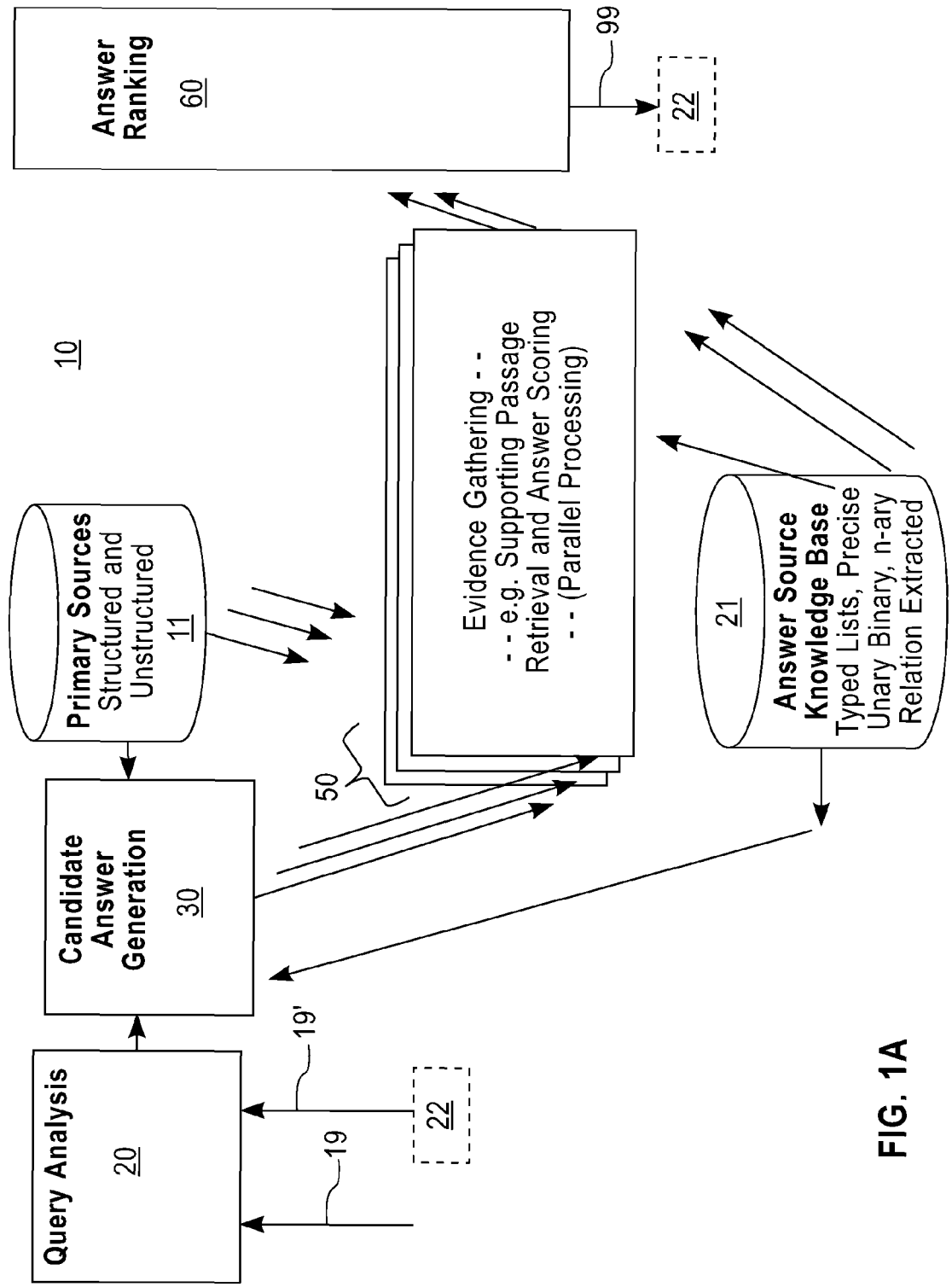
FIG. 1A shows a system diagram depicting a high level logical architecture and question/answering method for of the present invention.
Figure 1B:
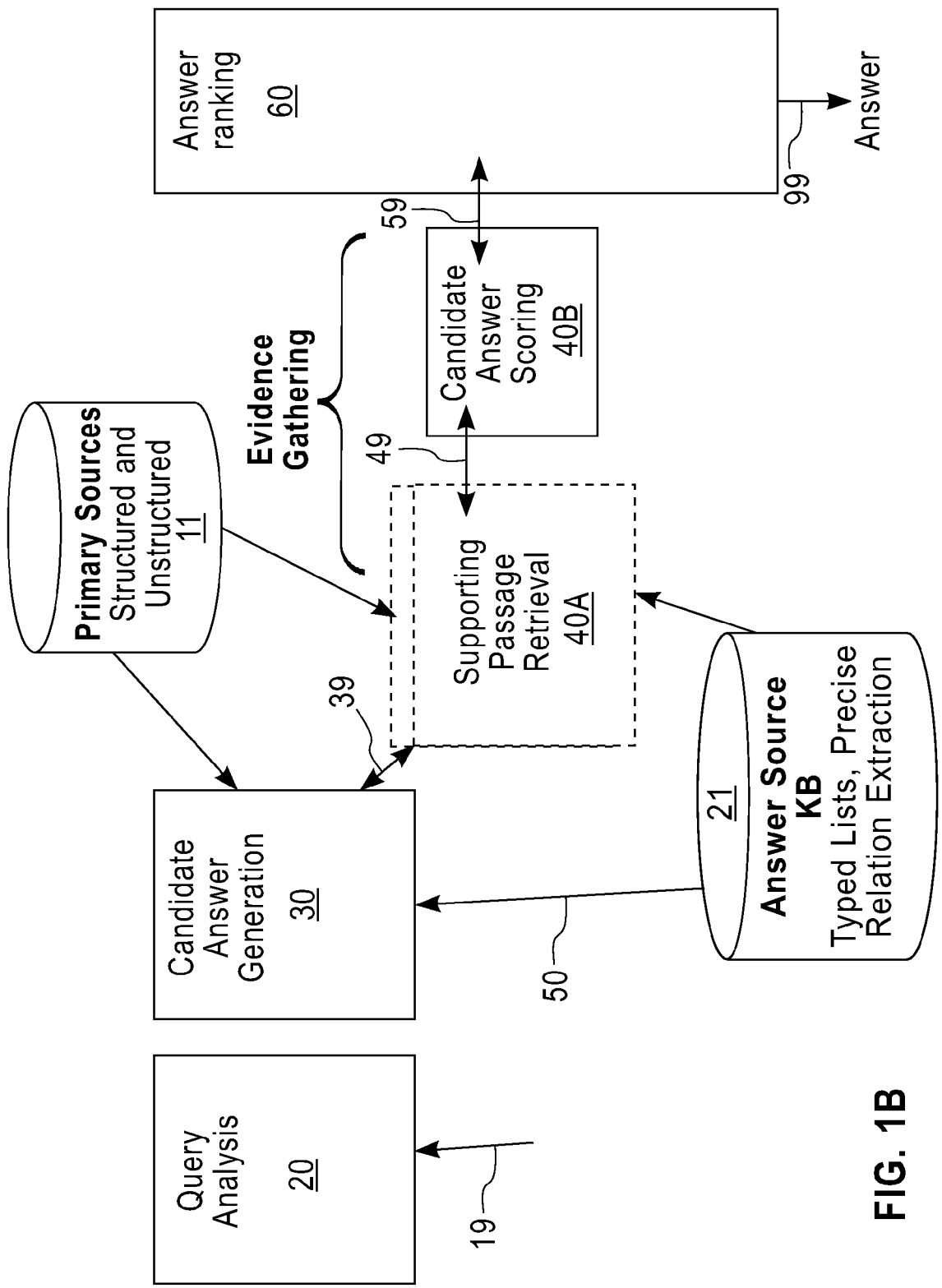
FIG. 1B shows another variant of the architecture where the Evidence Gathering module includes two submodules: Supporting Passage Retrieval and Candidate Answer Scoring.

FIG. 1A shows a system diagram depicting a high-level logical architecture 10 and methodology of the present invention. As shown in FIG. 1A, the high level logical architecture 10 includes the provision of a Query Analysis module 20 implementing functions for receiving and analyzing a user query or question. According to the invention, in one embodiment, a "user" refers to a person or persons interacting with the system, and the term "user query" refers to a query (and context) 19 posed by the user. However, it is understood other embodiments can be constructed, where the term "user" refers to a computer system 22 generating a query by mechanical means, and where the term "user query" refers to such a mechanically generated query and context 19'. A candidate answer generation module 30 is provided to implement search for candidate answers by traversing structured, semi structured and unstructured sources contained in a Primary Sources module 11 and in an Answer Source Knowledge Base module 21 containing collections of relations and lists extracted from primary sources. All the sources of information can be locally stored or distributed over a network, including the Internet. The Candidate Answer generation module 30 generates a plurality of output data structures containing candidate answers based upon the analysis of retrieved data. In FIG. 1A, a first embodiment is depicted that includes an Evidence Gathering module 50 interfacing with the primary sources 11 and knowledge base 21 for concurrently analyzing the evidence based on passages having candidate answers, and scoring each of candidate answers as parallel processing operations. In one embodiment, the architecture may be employed utilizing the Common Analysis System (CAS) candidate answer structures, and implementing Supporting Passage Retrieval as will be described in greater detail herein below. This processing is depicted in FIG. 1B where the Evidence Gathering module 50 comprises Supporting Passage Retrieval 40A and the Candidate Answer Scoring 40B as a separate processing modules for concurrently analyzing the passages and scoring each of candidate answers as parallel processing operations. The Answer Source Knowledge Base 21 may comprise one or more databases of structured or semi-structured sources (pre-computed or otherwise) comprising collections of relations (e.g., Typed Lists). In an example implementation, the Answer Source knowledge base may comprise a database stored in a memory storage system, e.g., a hard drive An Answer Ranking module 60 provides functionality for ranking candidate answers and determining a response 99 returned to a user via a user's computer display interface (not shown) or a computer system 22, where the response may be an answer, or an elaboration of a prior answer or request for clarification in response to a question—when a high quality answer to the question is not found.

It is understood that skilled artisans may implement a further extension to the system of the invention shown in FIG. 1A, to employ one or more modules for enabling I/O communication between a user or computer system and the system 10 according to, but not limited to: the following modalities of text, audio, video, gesture, tactile input and output etc. Thus, in one embodiment, both an input query and a generated query response may be provided in accordance with one or more of multiple modalities including text, audio, image, video, tactile or gesture.

This processing depicted in FIGS. 1A and 1B, may be local, on a server, or server cluster, within an enterprise, or alternately, may be distributed with or integral with or otherwise operate in conjunction with a public or privately available search engine in order to enhance the question answer functionality in the manner as described. Thus, the invention may be provided as a computer program products comprising instructions executable by a processing device, or as a service deploying the computer program product. The architecture employs a search engine (a document retrieval system) as a part of Candidate Answer Generation module 30 (and shown later as part of module 302 of FIG. 2A) which may be dedicated to the Internet, a publicly available database, a web-site (e.g., IMDB.com) or, a privately available database. Databases can be stored in any storage system, e.g., a hard drive or flash memory, and can be distributed over the network or not.

As mentioned, the invention makes use of the Common Analysis System (CAS), a subsystem of the Unstructured Information Management Architecture (UIMA) that handles data exchanges between the various UIMA components, such as analysis engines and unstructured information management applications. CAS supports data modeling via a type system independent of programming language, provides data access through a powerful indexing mechanism, and provides support for creating annotations on text data, such as described in (http://www.research.ibm.com/journal/sj/433/gotz.html) incorporated by reference as if set forth herein. It should be noted that the CAS allows for multiple definitions of the linkage between a document and its annotations, as is useful for the analysis of images, video, or other non-textual modalities (as taught in the herein incorporated reference U.S. Pat. No. 7,139,752).

In one embodiment, the UIMA may be provided as middleware for the effective management and interchange of unstructured information over a wide array of information sources. The architecture generally includes a search engine, data storage, analysis engines containing pipelined document annotators and various adapters. The UIMA system, method and computer program may be used to generate answers to input queries. The method includes inputting a document and operating at least one text analysis engine that comprises a plurality of coupled annotators for tokenizing document data and for identifying and annotating a particular type of semantic content. Thus it can be used to analyze a question and to extract entities as possible answers to a question from a collection of documents.

In one non-limiting embodiment, the Common Analysis System (CAS) data structure form is implemented as is described in commonly-owned, issued U.S. Pat. No. 7,139,752, the whole contents and disclosure of which is incorporated by reference as if fully set forth herein and described in greater detail herein below.

Figure 2A:
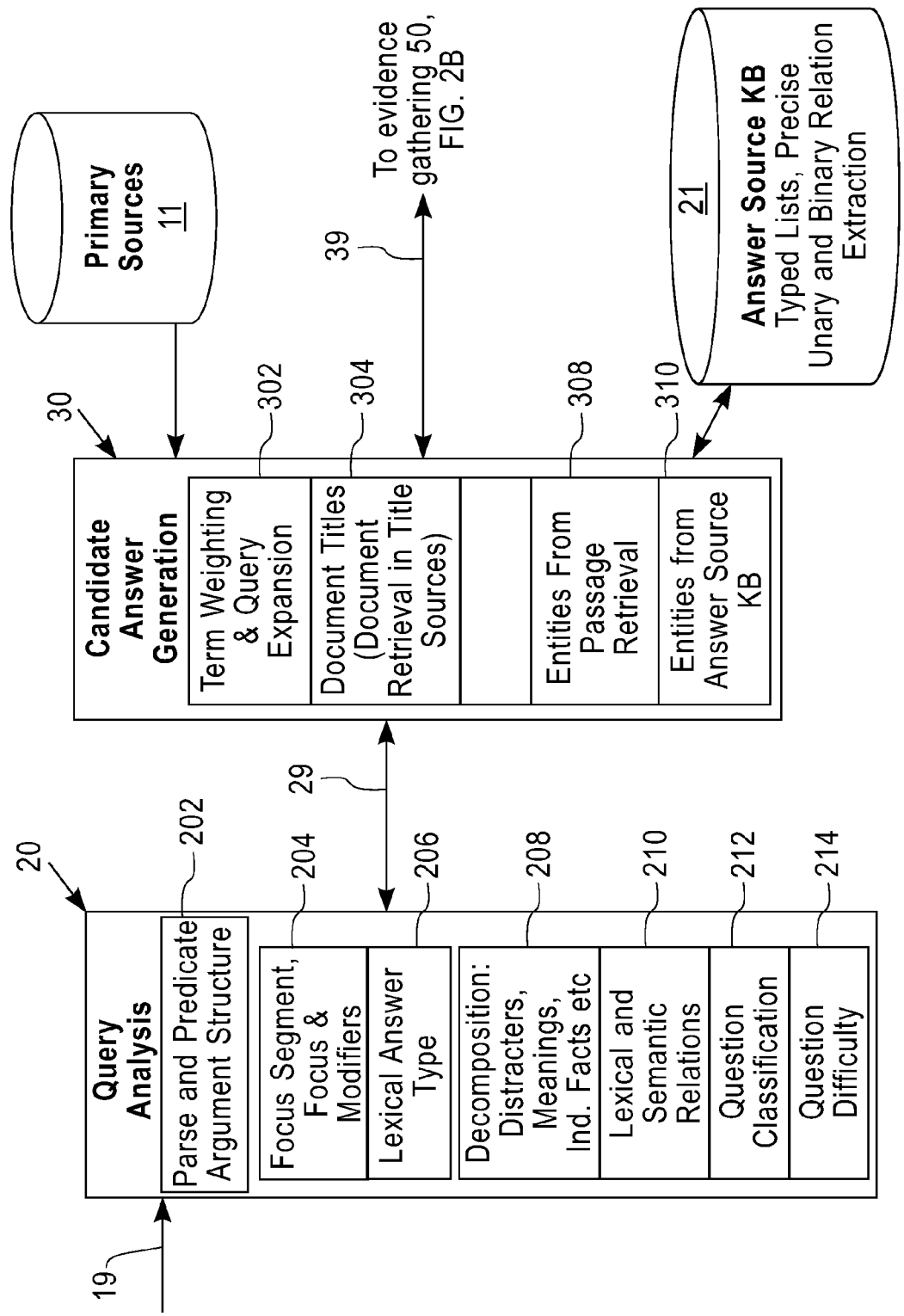
FIGS. 2A and 2B show more detailed logical architecture diagrams for processing shown in the high level logical architecture of FIGS. 1A and 1B.

As shown in greater detail in the more detailed logical architecture diagram of FIG. 2A, the "Query Analysis" module 20 receives an input that comprises the query 19 entered, for example, by a user via their web-based browser device. An input query 19 may comprise a string such as "Who was the tallest American president?". Alternately, a question may consist of a string and an implicit context, e.g., "Who was the shortest?". In this example, context may range from a simple another string e.g. "American presidents" or "Who was the tallest American president?" to any data structure, e.g. all intermediate results of processing of the previous strings—a situation arising e.g., in a multiple turn dialog. The input query is received by the Query Analysis module 20 which includes, but is not limited to, one or more the following sub-processes: A Parse and Predicate Argument Structure block 202 that implements functions and programming interfaces for decomposing an input query into its grammatical and semantic components, e.g., noun phrases, verb phrases and predicate/argument structure. An (English Slot Grammar) ESG-type parser may be used to implement block 202; A Focus Segment, Focus & Modifiers block 204 is provided that computes the focus and focus modifiers of the question, and which is further described below. Additionally provided is a Lexical Answer Type (LAT) block 206 that provides that implements functions and programming interfaces to provide additional constraints on the answer type (Lexical) as will be described in greater detail herein below; a Question decomposition block 208 that implements functions and programming interfaces for analyzing the input question to determine the sets of constraints specified by the question about the target answer. There are several ways that these constraints may relate to one another: 1) Nested constraints: Answer to "inner" question instantiates "outer" question. E.g., "Which Florida city was named for the general who led the fight to take Florida from the Spanish?"; 2) Redundant constraint: One constraint uniquely identifies the answer. E.g., "This tallest mammal can run at 30 miles per hour. Which is it?"; 3) Triangulation: Each constraint generates a set of answers and the correct answer is the one answer in common in the two (or more) sets: e.g., in a "puzzle"-style question "What is a group of things of the same kind, or scenery constructed for a theatrical performance".

As further shown in the detailed logical architecture diagram of FIG. 2A, a Lexical and Semantic Relations module 210 is provided to detect lexical and semantic relations in the query (e.g., predicate-argument relations) as is a Question Classification block 212 that may employ topic classifiers providing information addressing, e.g., what is the question about? Additionally provided is a Question Difficulty module 214 executing methods providing a way to ascertain a question's difficulty, e.g., by applying readability matrix to the question. It is understood that one or more of the query/question analysis processing blocks shown in FIG. 2A may be selected for a particular implementation.

Referring to FIG. 2A, in a non-limiting illustrative example, the Parse and Predicate Arguments Structure block 202 implements functions and programming interfaces for decomposing an input query into its grammatical components by performing a Lexical processing and a syntactic and predicate argument structure analysis as known in the art. For an example query: "In the 1960s this largest Kansas city became the world's largest producer of general aviation aircraft".

The Parse and Predicate Arguments block 202 will produce an example parse search results tree structure below with (eX providing an index into the tree, e.g., the "become" word is e8 (the 8$^{th}$ structure of the results tree), and e7 indexes the 7$^{th}$ word of the results tree structure) where 7 represents the word ("city") that is the first argument of "become" and e13 (indexes the 13$^{th}$ word of the results tree structure) is the "producer" which is the second argument of "become" in the semantic structure depicted:

in (e1,e3,e8)
the (e2,e3)
1960s (e3,u)
this (e4,e7)
large (e5,e7)
Kansas (e6,e7)
city (e7,u)
become (e8,e7,e13)
the (e9,e10)
world (e10,u,e13)
aposts (e11,e10)
large (e12,e13)
producer (e13,of:e17)
general (e15,e17)
aviation (e16,u,e17)
aircraft (e17)

The Focus Segment, Focus and Modifiers block 204 detects a Focus Segment which is the text span in the question the correct answer replaces: for example the italicized words represent the focus segment in the following query:

"In the 1960s this largest Kansas city became the world's largest producer of general aviation aircraft."

To detect a focus segment, a set of rules that operate on Predicate-Argument structures and the ESG parse are implemented that match Patterns in Predicate-Argument Structure (PAS). Example patterns include, e.g., a Noun Phrase; "what/which/this/these X", where X is another object(s); "who/what/when/where/why/this/these"; a Pronoun without a referent. An example of a pronoun pattern with the pronoun words italicized is as follows:

As a boy he built a model windmill; his calculus foe Gottfried Leibniz designed them as an adult.

With reference to the Lexical Answer Type (LAT) block 206, LAT is the question terms that identify the semantic type of the correct answer. The italicized words in the following passage represent the LAT in the following query:
"What Kansas city is the world's largest producer of general aviation aircraft"

LATs may include modifiers if they change the meaning. For example, the italicized words represent the LAT in the following query:
Joliet and Co found that the Mississippi emptied into what body of water ?

Referring to FIG. 2A, an output 29 of the Question/Query analysis block 20 comprises a query analysis result data structure (CAS structure). In this embodiment, an output data structure Question/Query analysis block 20 and candidate answer generation block may be implemented to pass the data among the modules, in accordance with the UIMA Open Source platform.

As shown in greater detail in the more detailed logical architecture diagram of FIG. 2A, the "Candidate Answer Generation" module 30 receives the CAS-type query results data structure 29 output from the Question/Query analysis block 20, and generates a collection of candidate answers based on documents stored in Primary Sources 11 and in Answer Source KB 21. The "Candidate Answer Generation" module 30 includes, but is not limited to one or more of the following functional sub-processing modules: A Term Weighting & Query Expansion module 302 implementing functions for creating a query against modules 11 and 21 (part of query generation) with an embodiment implementing query expansion (see, e.g., http://en.wikipedia.org/wiki/Query_expansion); a Document Titles (Document Retrieval in Title Sources) module 304 implementing functions for detecting a candidate answer (from sources 11 and 21); an Entities From Passage Retrieval module 308 implementing functions for detecting a candidate answer in textual passages, e.g. based on grammatical and semantic structures of the passages and the query; and, an KB Entities from Structured Sources module 310 implementing functions for retrieving a candidate answer based on matches between the relations between the entities in the query and the entities in Answer Source KB 21, (implemented e.g. as an SQL query).

As a result of implementing the functional modules of the Candidate Answer Generation block 30, a query is created and run against all of the structured and unstructured primary data sources 11 in the (local or distributed) sources database or like memory storage device(s). This query is run against the structured (KB), semi-structured (e.g., Wikipedia, IMDB databases, a collection of SEC filings in XBRL, etc.), or unstructured data (text repositories) to generate a candidate answer list 39 (also as a CAS, or an extension of prior CAS). It should be understood that, in one embodiment, the query is run against a local copy of the listed primary source databases, or, may be access the publicly available public database sources. Moreover, it should be understood that, in one embodiment, not all terms from the query need to be used for searching the answer—hence the need for creating the query based on results of the query analysis. E.g. "five letter previous capital of Poland"—the terms "five letter' should not be part of the query.

As further shown in FIG. 2A, the Answer Source Knowledge Base 21 is provided and shown interfacing with the Entities from Structured Sources module 310 that includes: Typed Lists (e.g., list of all countries in world), Precise Unary (e.g., a country), Binary (e.g., country+head of state of country), Ternary (e.g., country+head of state of country+wife of head of state), n-ary Relation Extracted, etc.

Referring back to the logical architecture diagram of FIG. 1B, the "Candidate Answer Scoring" module 40B receives a CAS-type data structure 49 (i.e., CAS or CASes) output from the Supporting Passage Retrieval (SPR) block 40A of Evidence Gathering block 50, for example. The "Candidate Answer Scoring" module 40B includes, but is not limited to, one or more of the following functional sub-processing modules: a Lexical & Semantic Relations in Passage module 402 implementing functions computing how well semantic (predicate/argument) relations in the candidate answer passages are satisfied (part of answer scoring); a Text Alignment module 405 implementing functions for aligning the query (or portion thereof) and the answer passage and computing the score describing the degree of alignment, e.g., when aligning answers in a quotation; a Query Term Matching in Passage module 407 implementing functions for relating how well a passage in the query match to terms in the candidate answer passages (part of answer scoring); a Grammatical Relations block 410 implementing functions for detecting a grammatical relations among candidate answers which can be subsumed under Lexical & Semantic Relations in Passage module 402; an Answer Look-up in KBs module 413 implementing functions for detecting the candidate answer based on the score ranking; and, a Candidate Answer Type Analysis (produces a probability measure that Candidate Answer is of the correct type based, e.g., on a grammatical and semantic analysis of the document with which the Candidate Answer appears) module 415. The output of the "Candidate Answer Scoring" module 40B is a CAS structure having a list of answers with their scores given by the modules.

As described herein, multiple parallel operating modules may be implemented to compute the scores of the candidate answers with the scores provided in CAS-type data structures 59 based on the above criteria: e.g., is the answer satisfying similar lexical and semantic relations (e.g. for a query about an actress starring in a movie, is the answer a female, and does the candidate satisfy actor-in-movie relation?); how well does the answer and the query align; how well the terms match and do the terms exist in similar order. Thus, it is understood that multiple modules are used to process different candidate answers and thus, potentially provide many scores in accordance with the number of potential scoring modules.

Figure 2B:
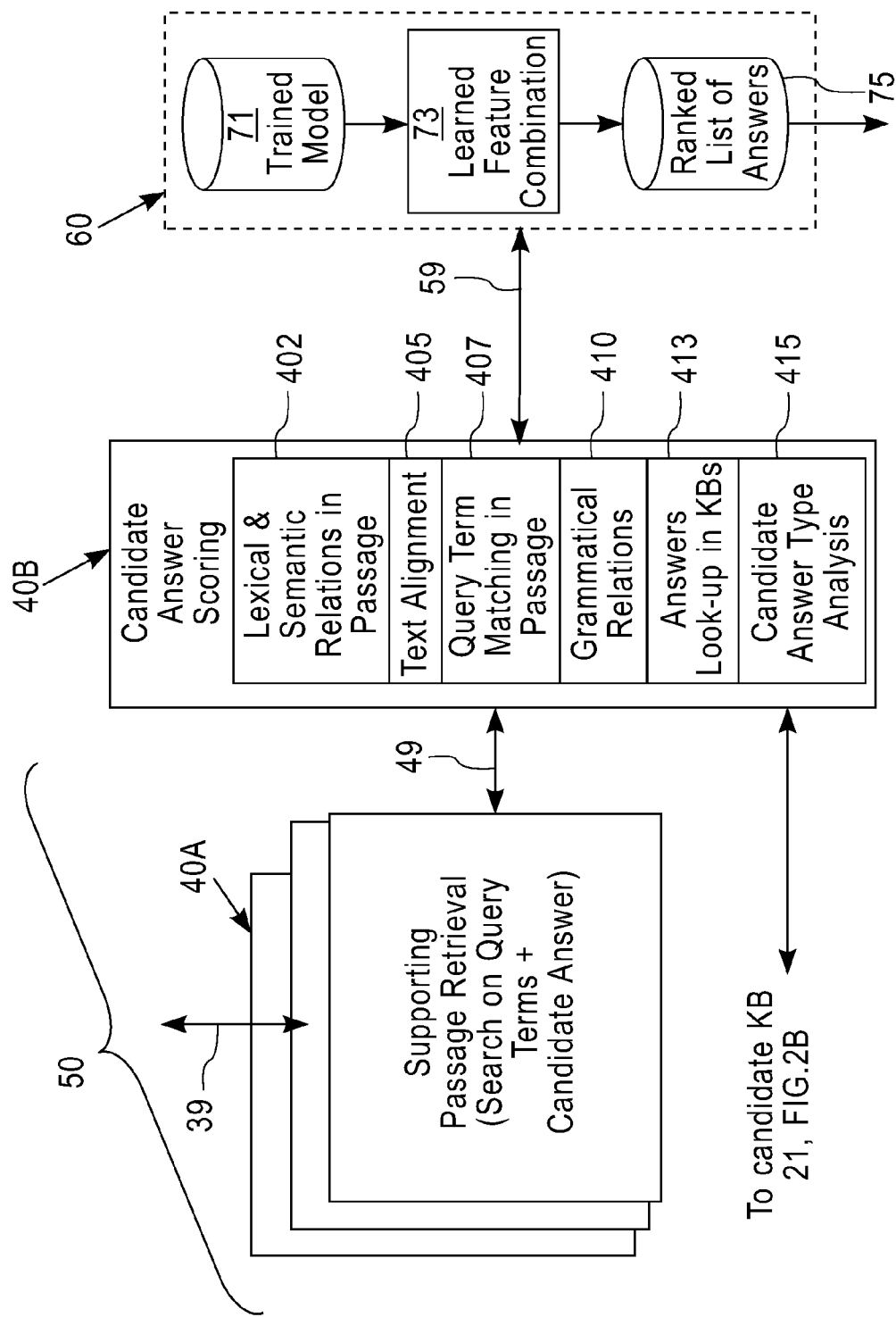

Referring back to the logical architecture diagram of FIGS. 1B, 2B the "answer ranking" module 60 thus receives a plurality of CAS-type data structures 59 output from the Evidence Gathering block 50 (which includes implementing SPR 40A and Candidate Answer Scoring 40B), and generates a score for each candidate answer. FIG. 2B shows a machine learning implementation where the "answer ranking" module 60 includes a trained model component 70 produced using a machine learning techniques from prior data. The prior data may encode information on features of candidate answers, the features of passages the candidate answers come, the scores given to them by Candidate Answer Scoring modules 40B, and whether the candidate answer was correct or not. In other words, machine learning algorithms can be applied to the entire content of the CASes together with the information about correctness of the candidate answer. Such prior data is readily available for instance in technical services support functions, or in more general setting on Internet, where many websites list questions with correct answers. The model encodes a prediction function which is its input to the "Learned Feature Combination" module 73.

Thus, in FIG. 2B, there is input to the answer ranking module 60 a list of candidate answers, as a CAS, in addition to a trained model that is stored in the trained model sub-module 71 and whose parameters depend on the type of the query. The answer ranking module 60 includes a learned feature combination sub-block 73 which implements functionality that generates a ranked list of answers 75. An output of the answer ranking module 60 includes an answer to the query (one or a list); and, optionally a clarification question (if the system is engaging in a dialog or if none of the produced answers has a high rank). The learned feature combination sub-block 73 applies the prediction function produced by Trained Model 71, for example it implements methods that weight the scores of candidate answers based on the trained model. An example implementation of the training block 71 and of Learned Feature Combination 73 may be found in the reference to Ittycheriah, A. et al, entitled "{IBM}'s Statistical Question Answering System—{TREC}—"Text {REtrieval} Conference" in 2001 at ttp://citeseer.ist.psu.edu/cache/papers/cs2/7/http:
zSzzSztrec.nist.govzSzpubszSztrec10zSz.zSzpa
perszSztrec2001.pdf/ittycheriah01ibms.pdf).

More particularly, the application of a machine learning Trained Model 71 and the Learned Feature Combination 73 is now described in more detail. In one embodiment, a two-part task is implemented to: 1. Identify best answer among candidates; and, 2. Determine a confidence. In accordance with this processing, 1. Each question-candidate pair comprises an Instance; and, 2. Scores are obtained from a wide range of features, e.g., co-occurrence of answer and query terms; whether candidate matches answer type; and, search engine rank. Thus, for an example question, "What liquid remains after sugar crystals are removed from concentrated cane juice"

example scores such as shown in the Table 1 below are generated based on but not limited to: Type Analysis (TypeAgreement is the score for whether the lexical form of the candidate answer in the passage corresponds to the lexical type of the entity of interest in the question); Alignment (Textual Alignment scores the alignment between question and answer passage); Search engine Rank; etc.

TABLE 1

| Candidate | Type | Align | Rank | Score |
|---|---|---|---|---|
| Milk | 1 | 0.2 | 3 | 0.46 |
| Muscovado | 0 | 0.6 | 1 | 0.48 |
| Molasses | 1 | 0.5 | 2 | 0.8 |

Thus, in this embodiment, candidate answers are represented as instances according to their answer scores. As explained above, a classification model 71 is trained over instances (based on prior data) with each candidate being classified as true/false for the question (using logistic regression or linear regression function or other types of prediction functions as known in the art). This model is now applied, and candidate answers are ranked according to classification score with the classification score used as a measure of answer confidence, that is, possible candidate answers are compared and evaluated by applying the prediction function to the complete feature set or subset thereof. If the classification score is higher than a threshold, this answer is deemed as an acceptable answer. Using the numbers for Type, Align and Rank of Table 1, and the prediction function (Score) given by an example linear expression:

$$=0.5*Type+0.8*Align+(1-Rank)*0.1$$

values are obtained for Milk, Muscovado, and Molasses 0.46, 0.48 and 0.8 (respectively, and the higher value being better). These values are represented in the Score column of TABLE 1. This example of scoring function is given for illustration only, and in the actual application more complex scoring functions would be used. That is, the mathematical expression would be based, for instance, on the logistic regression function (a composition of linear expressions with the exponential function), and would be applied to a much larger number of features.

Figure 3:
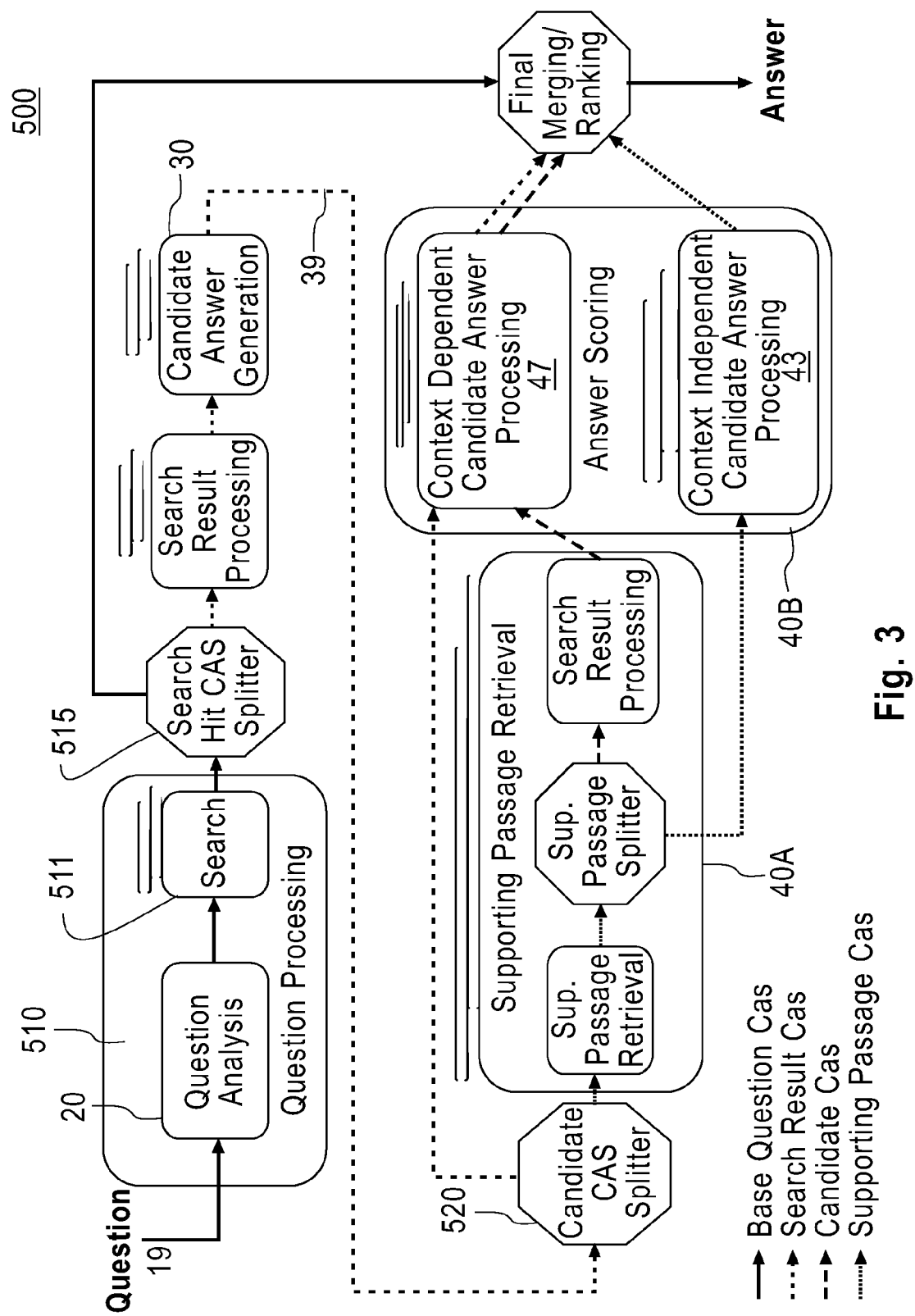
FIG. 3 is an example flow diagram depicting method steps for processing questions and providing answers according to the invention; and, FIG. 4 depicts an aspect of a UIMA framework implementation for providing one type of analysis engine for processing CAS data structures.

FIG. 3 is a block diagram 500 depicting system operation. At step 510, a query is received by the system programmed to perform the steps of the invention. The set of instructions are executed in the computing environment comprising one or more processors or computing devices. The query is analyzed and parsed into elements suitable for searching by the search engine 511 (performing the information retrieval function of module 30 in FIGS. 1A and 1B).

FIG. 3 also represents a Data Model defining the data structures supplied as input to, or produced as output by, the system components shown in FIGS. 1A, 1B. The Data Model provides documentation about what a given component does, and it enables independently developed components to be integrated with a fairly high degree of confidence that they will correctly inter-operate. The Data Model is formally defined as a UIMA Type System and has a declarative specification in a UIMA Type System descriptor. As known, the Unstructured Information Management Architecture (UIMA) framework is an open, industrial-strength, scalable and extensible platform for building analytic applications or search solutions that process text or other unstructured information to find the latent meaning, relationships and relevant facts buried within (http://incubator.apache.org/uima/).

The Data Model is instantiated with a UIMA CAS (the container for instances of types in the type system.

The type system has a few basic design points.

1. A CAS represents a single question however, it is not so limited, i.e., includes the question of some prior focus (category, prior question or answer, or question meta-data some element of the context is also provided
2. The question is the subject of analysis in the initial CAS view
3. Processing is divided into several phases, where each phase may generate multiple, new CASes with new subjects of analysis and corresponding views, but the original question view is carried in every CAS. It is understood that variations are possible.

All processing results may be added to the original CAS (with intermediate results carrying the way through to the end of processing) and the final answer generated by the system is posted as an annotation in the CAS.

In one example embodiment, the data model includes a base annotation type that many of the types extend the uima.tcas.Annotation (see http://incubator.apache.org/UIMA). Each class (e.g., an annotator) can also provide an estimate of the correctness of the annotations it creates.

In one exemplary embodiment, as part of the question analysis performed during the questions processing phase 510, the question 19 is received and the CAS is initialized with the question (and the question context). Two initial annotations are created: a Question annotation with meta-data about the question, and a QaResult annotation that consolidates all of the question analysis results by either containing the results directly, or pointing to other annotations that represent question analysis results.

The base Question annotation type is defined to optionally include any associated meta-data such as: the source of the question (TREC, technical support, TV show, etc.), prior dialog, or other contextual information (for example, about information contained in the input expressed in other modalities).

The question type can be further specialized into example subtypes modeling questions that Question which class defines a Type (i.e., question type, for example, one of FACTOID, LIST, DEFINITION, OTHER, OPINION or UNCLASSIFIED question types).

An initial step in analyzing the question is to run the NLP (Natural Language Processing) stack on the question. Natural language processing typically includes syntactic processing (e.g. using the ESG parser) and derivation of predicate-argument structure. This processing is performed in accordance with the standard UIMA fashion, where the NLP stack is run as an aggregate analysis engine on the CAS. All of the NLP stack results are added to the CAS as annotations extending Hutt (add Hutt reference) and ESG type systems] in the preferred embodiment.

After NLP stack processing, the question analysis components are run, which includes question classification, answer type detection, and focus identification, for example, as shown in the query analysis block of FIG. 2A. The question may be classified based on question types (metadata), each of which may require special downstream processing. The result of this classification may be stored in a QClass annotation:

Example downstream processing may include processing a puzzle question (—where getting the answer requires synthesis information from multiple sources, inference, etc.); an audio_visual question that requires audio/visual processing; a simple_factoid question with quotes, or named entities, etc.; a FACTOID about a fact that can be "looked up"; and, a DEFINITION that contains a definition of the answer and where the words defined by the question is expected as an answer.

The typical question analysis processes shown in FIG. 2A produces several annotations, including the focus, answer type, semantic role labels, constraints, and marks any portion of the question that represents a definition.

For the above annotation types, the Question Analysis component 510 will create an instance of the annotation, set the span over the question text (if appropriate), and set any other features in the annotation. Note that there may be multiple instances of these annotations.

The question and the results of question analysis are used to generate an abstract representation of the query, which for purposes of description, is referred to as the AbstractQuery. The abstract query represents all searchable keywords and phrases in the question, along with the semantic answer type (if it was detected).

The abstract query is represented using the following types: a synonym (all query concepts underneath are synonyms of each other); a phrase (all query concepts in order are a phrase); a tie (an "or", i.e., a disjunction of the argument nodes); a weight (the concepts underneath are weighted per the float stored in the operator); required (the concepts underneath are all required, if possible); and, relation (the concepts underneath are below a relation, which is stored within the operator).

Referring to FIG. 3, in question processing block 510, after question analysis, search processing begins which may include searching primary structured and unstructured sources, e.g. Google, a local copy of Wikipedia, or database look-up.

Each search engine has a query generator that generates an engine-specific query from the abstract query and formats it in the query syntax for the search engine. The search engine then processes the query and adds a search result hit-list to the CAS. A Search object contains the search engine query, an identifier for the search engine, and the search results.

In one embodiment, a search result is represented by a SearchResult object, which contains an identifier for the result (a URI), a score for the result, and the actual content of the result, i.e., the passage text, knowledge base tuple, etc. The SearchResult may be specialized for different kinds of search engines and corresponding search results.

The Document object may be created to represent the result delivered by search engine. This object may include a title of the document and a unique identifier for this document, and other data and meta-data. The passage object may be used with a search engine that returns passages. It may add to the document object the offset (e.g., a character offset of the start of this passage within the document that contains this passage, and a character offset of the end of this passage within the document that contains this passage) and passage length metadata for the passage hit.

Referring back to FIG. 3, as shown, the data in the example CAS structure is output of the search results block of the question analysis processing step 510 and about to be processed in parallel. A Search Hit CAS splitter mechanism that is used to initiate a parallel search for candidate answers. For parallel operations, the search list (search result passages) are distributed by the CAS splitter element 515 so that concurrent search results processing techniques are applied (work divided) to process each of the found search results and perform candidate answer generation (in parallel) using the techniques described herein in the Candidate Answer Generation block 30 (FIG. 2A).

With respect to Candidate Answer Generation, during candidate answer generation, candidate answers are identified in the search result. In one example implementation, a candidate answer is represented at two different levels: A CandidateAnswerVariant is a unique candidate answer string (possibly the result of some very simple normalization). A CandidateAnswerCanon is a canonicalized candidate answer that groups together semantically equivalent variants. Both of these types extend an abstract base class CandidateAnswer which class defines the candidate answer string and features associated with this candidate answer.

That is, a class (e.g., CandidateAnswer) for candidate answers provides the candidate answer string and features associated with this candidate answer. In operation, one or more of its sub-types may be instantiated. One sub-type includes a variant of a candidate answer class (CandidateAnswerVariant) defined that may have multiple occurrences, all of which are collected in a variant object and defines the occurrences of this variant. A CandidateAnswerOccurrence class is provided that annotates a span of text identified as a candidate answer and defines: the manner in which covered text refers to some entity, e.g. NAME, PRONOUN, CITY; the source of the candidate answer; the character offset of the start of this candidate answer within the text of the source; and, the character offset of the end of this candidate answer within the text of the source.

With respect to Candidate Answer Generation, during candidate answer generation, candidate answers are identified in the search result. In one example implementation, candidate answers are derived from document titles; another method may derive a candidate answer from one or more elements in the candidate passage. Candidate answers can be normalized where by several spelling variants can be identified in one canonical form.

Referring to FIG. 3, as shown, the data in the example CAS structure 39 output of the search results processing and candidate answer generation block 30 is again processed in parallel by a Candidate Answer CAS splitter mechanism 520 that is used to parallelize the candidate answers for input to the Supporting Passage Retrieval block 40A. That is, for each set of candidate answers, the CAS is split into separate CASes such that each CAS includes one or more candidate answers and is sent to evidence gathering module 50 for processing.

Referring back to FIGS. 1A, 1B, the Evidence Gathering module 50 that implements (parallel processing) and supports passage retrieval and answer scoring according to the invention is now described in greater detail with respect to FIG. 3.

Traditionally, passage retrieval is used in candidate answer generation wherein using keywords from the question, passages are found from unstructured corpora. Then candidate answers are extracted from those passages.

In accordance with the present invention, Supporting Passage Retrieval (SPR) operates after candidate answer generation. For each resulting candidate passage, the passage content are traversed to find/look for those passages having candidate answer in addition to question terms. It is understood that better passages can be found if it is known what candidate answer is being looked for. For each resulting candidate, the sources are traversed to find those passages having candidate answers in addition to question terms (i.e., another search is conducted against the original primary sources (databases) or the Candidate KB. In another embodiment the search can be conducted against cached search results (past passages). It is understood that the best results are obtained if search is repeated with candidate answer included together with the question terms.

Supporting Passages are then scored by multiple Scorers by conducting one or more of the following: Simple Term Match Score implementing executable instructions for counting the number of terms that match; Textual Alignment implementing executable instructions for determining if words appear in the same or similar order with a similar distance between them so they are not separated much (aligned) this is advantageous to find a quotation to find quotes, for example, an alignment would be performed to get the best result; and, a deeper analysis implementing executable instructions for determining the meaning of the passages/question (i.e., lexical and/or semantic relations). Each of these analyses produces a score.

An example Evidence Gathering is now shown for non-limiting, illustrative purposes. In this example, a query is given as follows:

'In 2002, who became the first Republican sitting senator ever to host "Saturday Night Live"?'

In the Query Generation implementing stopword removal (that is removal from the query of the most frequent words such as "a", "an", "the", "is/was/be . . . ", "become/became . . . " . . . ), the query becomes:

'Republican first sitting senator ever host "Saturday Night Live" 2002'

After query generation, in one embodiment, the query is sent to an Internet search engine, e.g., such as provided by MSN, the top 20 result documents are read. The following depicts example passage extraction results (candidate answers) for the example question search results for 'Republican first sitting senator ever host "Saturday Night Live" 2002'. In each document, passages are identified in that include each candidate answer (i.e., John McCain or Al Gore), along with as many question keywords as possible shown italicized. Both example passages include a passage score that, in one exemplary embodiment, is calculated as:

Passage Score=# of query terms in passage/total # of query terms

Candidate: John McCain
Document: http://doney.net/aroundaz/celebrity/mccain_john.htm Passage: Representative from Arizona 1st District (1983-1987), POW (1967-1972), Navy pilot, first sitting Senator to host Saturday Night Live (2002). Born in the Panama Canal Zone, John McCain shares the headstrong, blunt, maverick traits of his father and grandfather, who were the first father and son four star Admirals in the U.S.
Passage Score: 8/11=0.73
Candidate: Al Gore
Document: http://www.imdb.com/title/tt0072562/news Passage: 17 Dec. 2002 (StudioBriefing) No longer a candidate for the presidency in 2004, Al Gore may have a whole new career cut out for him as the host of a late-night comedy show, judging by the ratings for the December 14 edition of NBC's Saturday Night Live.
Passage Score: 5/11=0.45

Additionally calculated, in one embodiment, is an SPR Answer Score that is calculated, in one embodiment, as a decaying sum of scores of passages containing that answer as shown in equation 1)

$$\text{AnswerScore} = P_0 + nP_1 + n^2P_2 + n^3P_3 + \ldots \qquad 1)$$

where, $P_i$ is the $i^{th}$ highest passage score, and "n" is a constant <1 (e.g., 0.1).

Thus, for the example query 'Republican first sitting senator ever host "Saturday Night Live" 2002" the SPR "AnswerScore" for Candidate John McCain is calculated as:

1) Taking the first candidate answer passage for John McCain with question keywords shown italicized, to wit:
Representative from Arizona 1st District (1983-1987), POW (1967-1972), Navy pilot, first sitting Senator to host Saturday Night Live (2002). Born in the Panama Canal Zone, John McCain shares the headstrong, blunt, maverick traits of his father and grandfather, who were the first father and son four star Admirals in the U.S. there is calculated a passage score of [Score: 0.74].

2) Taking an example second candidate answer passage for John McCain, to wit:
John McCain, Meghan regaled reporters with tales of her days as an intern at Saturday Night Live in 2004. & quot; Slave work, & quot; she says, & quot; but I had an amazing time. There is calculated a passage score of [Score: 0.27]

3) Taking an example third candidate answer passage for John McCain, to wit:
The most prominent Republican Arizona Senator John McCain was portrayed as a loser because of his support for staying the course in Iraq. There is calculated a passage score of [Score: 0.18].

Thus, a Combined AnswerScore for candidate answer John McCain, in accordance with equation 1), with n=0.1, becomes:

$$0.74 + (0.1)(0.27) + (0.01)(0.18) = 0.7688.$$

Similarly, for the example query "2002 Republican first sitting senator ever host Saturday Night Live" the SPR "AnswerScore" for Candidate Al Gore is calculated as:

1) Taking the first candidate answer passage for Al Gore with question keywords shown italicized, to wit:
17 Dec. 2002 (StudioBriefing) No longer a candidate for the presidency in 2004, Al Gore may have a whole new career cut out for him as the host of a late-night comedy show, judging by the ratings for the December 14 edition of NBC's Saturday Night Live . . . , there is calculated a passage score of [Score: 0.45].

2) Taking the second candidate answer passage for Al Gore, to wit:
Also in attendance were former Presidents George Bush, Gerald Ford, Jimmy Carter, former Vice-president Al Gore former Senator Bob Dole and all their wives. Was portrayed on "Saturday Night Live" (1975) by Phil Hartman, Chris Farley (once), David Spade (once), Chris Elliot (once), Michael McKean, and Darrell Hammond. There is calculated a passage score of [Score: 0.36].

3) Taking the third candidate answer passage for Al Gore, to wit:
Also in attendance were former Presidents George Bush, Gerald Ford, Jimmy Carter, former Vice President Al Gore, former Senator Bob Dole and all their wives. [September 2001]. Was portrayed on " Saturday Night Live" (1975) by Phil Hartman, Chris Farley (once), David Spade (once), Chris Elliott (once), Michael McKean, and Darrell Hammond. There is calculated a passage score of [Score: 0.36]

4) Taking the fourth candidate answer passage for Al Gore, to wit:
Remember Al Gore's "Saturday Night Live" skit where he pretended to be President and the world was a glorious place? There is calculated a passage score of [Score: 0.27]

Thus, a Combined AnswerScore for candidate answer Al Gore, as calculated by the SPR module in accordance with equation 1), becomes:

$$0.45+(0.1)(0.36)+(0.01)(0.36)=0.4896$$

It is noted that an Answer scoring in accordance with a simple sum scheme would have been 1.44 for Al Gore, which would have beat a score of 1.19 in a simple sum calculation for John McCain.

The answer scores for each candidate answer would be included in the CAS.

Referring back to FIG. 3, in module 50 supporting passages are retrieved. Functionality is initiated after the CAS split, supporting passage records created by Supporting Passage Retrieval and since there may be many of them the splitter rounds the new CASes (with all information that was computer previously: context, query, candidate answer, supporting passage) to Answer Scoring.

The results contain many CASes containing (among other elements) the three important items: a candidate answer, the question terms, and a supporting passage. Since thousands of such CASes can be generated per one question, these candidates are scored in parallel. In a preferred embodiment, the candidate scoring performed by candidate scoring module 40B can be subdivided into two classes: context independent scoring 43 (where the answer can be scored independently of the passage) and context dependent scoring 47 (where the answer score depends on the passage content). For example, if the candidate answer is obtained from the document title, the score will not dependent on the content of the passage, and are context independent. On the other hand, other types of candidate answer scoring based on text alignment (module 405, FIG. 2B), grammatical relations (module 410, FIG. 2B), or lexical and semantic relations (module 402, FIG. 2B) require a comparison between the query and the passage, and are context dependent. Since most of these methods depend on the computation of grammatical and semantic relations in the passage, search results must be processed (in the Search Result Processing module in SPR block 40A) prior to Context Dependent Candidate Answer processing in 47.

The results of an answer scorer are saved in the CAS. Referring back to FIG. 3, during the final phase of processing 60, all of the candidate answer features are aggregated and merged, and the final candidate answer scoring function is applied (as described above with respect to the example scores provided in Table 1. Since a given candidate answer may appear in multiple passages, the Final Merge/Rank annotator must collect results across CASes, normalize and merge candidate answers, merge feature scores produced by the same answer scorer across multiple instances of the candidate answer, and aggregate the results. The normalized, merged, and aggregated results are input to the scoring function to produce a final score for the candidate answer. The final scoring results are saved as an answer and//or delivered to a user: It should be noted that Final merging and ranking is incremental, i.e., the machine provides the best so far answer as the computation on different nodes completes. Once all nodes complete, the final (top) answer(s) is delivered. Thus, in one embodiment, the final AnswerList and Answers are added to the original Question view, and the question answering process is complete.

It should also be noted that if the system is unable to find an answer or to find an answer with a high score (based, e.g., upon comparison to a preset threshold), the system might ask user a clarifying question, or deliver a collection of answers, or admit a failure and ask the user for further direction. A person skilled in the art would be able to implement such a dialog based e.g. on U.S. Pat. Nos. 6,829,603 and 6,983,252, both of which are incorporated by reference as if fully set forth herein, and a reference entitled "Natural language dialogue for personalized interaction" authored by Wlodek Zadrozny, et al. and found in Communications of the ACM archive, Volume 43, Issue 8, (August 2000), Pages: 116-120, (http://portal.acm.org/citation.cfm?id=345164).

A person skilled in the art would be able to implement a further extension to the system of the invention to employ modes of multimodal communication (using the U.S. Pat. No. 7,136,909) involving multiple modalities of text, audio, video, gesture, tactile input and output etc. As mentioned above, examples of such interaction include a cell phone user is asking a question using voice and is receiving an answer in a combination of other modalities (voice, text and image), or an interaction with a video game.

The data model and processing models described herein are designed to enable parallel processing, and to admit a "streaming" model of computation, where results become available incrementally, before all processing is complete. This streaming model is desirable if the analytics are able to identify and process the most likely candidates first, and continue to improve scoring estimates with more processing time.

As mentioned, in one embodiment, the above-described modules of FIGS. 1A-1B, 2A-2B can be represented as functional components in UIMA is preferably embodied as a combination of hardware and software for developing applications that integrate search and analytics over a combination of structured and unstructured information. The software program that employs UIMA components to implement end-user capability is generally referred to as the application, the application program, or the software application.

The UIMA high-level architecture, one embodiment of which is illustrated in FIGS. 1A-1B, 2A-2B, defines the roles, interfaces and communications of large-grained components that cooperate to implement UIM applications. These include components capable of analyzing unstructured source artifacts, such as documents containing textual data and/or image data, integrating and accessing structured sources and storing, indexing and searching for artifacts based on discovered semantic content.

Although not shown, a non-limiting embodiment of the UIMA high-level architecture includes a Semantic Search Engine, a Document Store, at least one Text Analysis Engine (TAE), at least one Structured Knowledge Source Adapter, a Collection Processing Manager, at least one Collection Analysis Engine, all interfacing with Application logic. In one example embodiment, the UIMA operates to access both structured information and unstructured information to generate candidate answers and an answer in the manner as discussed herein. The unstructured information may be considered to be a collection of documents, and can be in the form of text, graphics, static and dynamic images, audio and various combinations thereof.

Figure 4:
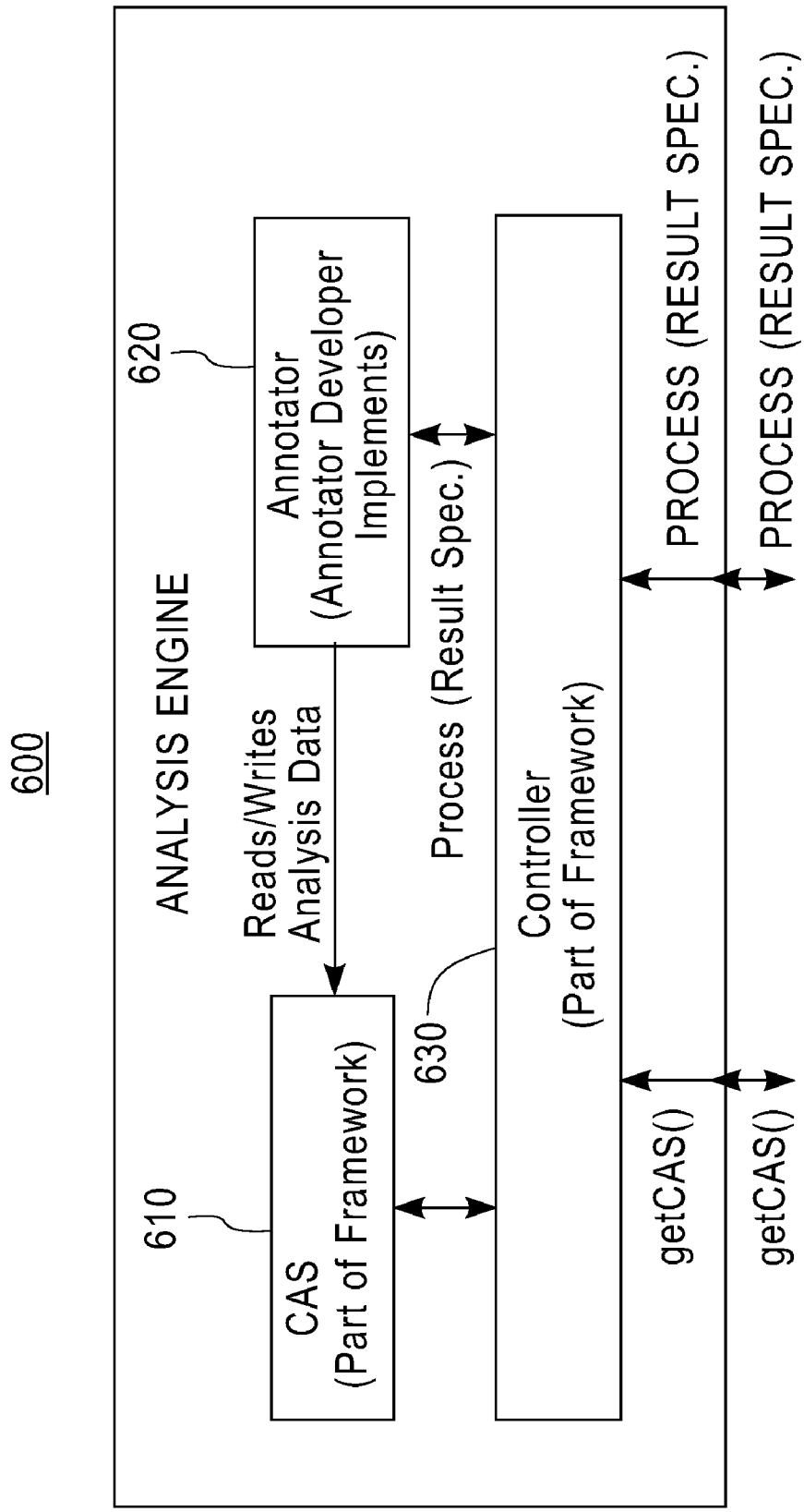

Aspects of the UIMA are further shown in FIG. 4, where there is illustrated a Analysis Engine (AE) 600 that can be a component part of the Text Analysis Engine. Included in the AE 600 is a Common Analysis System (CAS) 610, an annotator 620 and a controller 630. A second embodiment of a TAE (not shown) includes an aggregate Analysis Engine composed of two or more component analysis engines as well as the CAS, and implements the same external interface as the AE 600.

Common Analysis System 210

The Common Analysis System (CAS) 610 is provided as the common facility that all Annotators 620 use for accessing and modifying analysis structures. Thus, the CAS 610 enables coordination between annotators 620 and facilitates annotator 620 reuse within different applications and different types of architectures (e.g. loosely vs. tightly coupled). The CAS 210 can be considered to constrain operation of the various annotators.

The CAS 210 principally provides for data modeling, data creation and data retrieval functions. Data modeling preferably defines a tree hierarchy of types, as shown in the example Table 2 provided below. The types have attributes or properties referred to as features. In preferred embodiments, there are a small number of built-in (predefined) types, such as integer (int), floating point (float) and string; UIMA also includes the predefined data type "Annotation". The data model is defined in the annotator descriptor, and shared with other annotators. In the Table 2, some "Types" that are considered extended from prior art unstructured information management applications to accommodate question answering in the preferred embodiment of the invention include:

TABLE 2

| TYPE (or feature) | TYPE's PARENT (or feature type) |
|---|---|
| Query Record | Top |
| Query | Query Record |
| Query Context | Query Record |
| Candidate Answer Record | Annotation |
| Candidate Answer | Candidate Answer Record |
| Feature: CandidateAnswerScore | Float |
| Supporting Passage Record | Candidate Answer Record |
| Feature: SupportingPassageScore | Float |

In Table 2, for example, all of the question answering types (list in the left column) are new types and extend either another new type or an existing type (shown in the right column). For example, both Query and Query Context are kinds of Query Record, a new type; while Candidate Answer Record extends the UIMA type Annotation, but adds a new feature CandidateAnswerScore which is a Float.

CAS 610 data structures may be referred to as "feature structures." To create a feature structure, the type must be specified (see TABLE 2). Annotations (and—feature structures) are stored in indexes.

The CAS 610 may be considered to be a collection of methods (implemented as a class, for example, in Java or C++) that implements an expressive object-based data structure as an abstract data type. Preferably, the CAS 610 design is largely based on a TAE 130 Feature-Property Structure, that provides user-defined objects, properties and values for flexibility, a static type hierarchy for efficiency, and methods to access the stored data through the use of one or more iterators.

The abstract data model implemented through the CAS 210 provides the UIMA 100 with, among other features: platform independence (i.e., the type system is defined declaratively, independently of a programming language); performance advantages (e.g., when coupling annotators 210 written in different programming languages through a common data model); flow composition by input/output specifications for annotators 210 (that includes declarative specifications that allow type checking and error detection, as well as support for annotators (TAE) as services models); and support for third generation searching procedures through semantic indexing, search and retrieval (i.e. semantic types are declarative, not key-word based).

The CAS 210 provides the annotator 220 with a facility for efficiently building and searching an analysis structure. The analysis structure is a data structure that is mainly composed of meta-data descriptive of sub-sequences of the text of the original document. An exemplary type of meta-data in an analysis structure is the annotation. An annotation is an object, with its own properties, that is used to annotate a sequence of text. There are an arbitrary number of types of annotations. For example, annotations may label sequences of text in terms of their role in the document's structure (e.g., word, sentence, paragraph etc), or to describe them in terms of their grammatical role (e.g., noun, noun phrase, verb, adjective etc.). There is essentially no limit on the number of, or application of, annotations. Other examples include annotating segments of text to identify them as proper names, locations, military targets, times, events, equipment, conditions, temporal conditions, relations, biological relations, family relations or other items of significance or interest.

Typically an Annotator's 220 function is to analyze text, as well as an existing analysis structure, to discover new instances of the set of annotations that it is designed to recognize, and then to add these annotations to the analysis structure for input to further processing by other annotators 220.

In addition to the annotations, the CAS 610 of FIG. 4 may store the original document text, as well as related documents that may be produced by the annotators 620 (e.g., translations and/or summaries of the original document). Preferably, the CAS 610 includes extensions that facilitate the export of different aspects of the analysis structure (for example, a set of annotations) in an established format, such as XML.

More particularly, the CAS 610 is that portion of the TAE that defines and stores annotations of text. The CAS API is used both by the application and the annotators 620 to create and access annotations. The CAS API includes, preferably, at least three distinct interfaces. A Type system controls creation of new types and provides information about the relationship between types (inheritance) and types and features. One non-limiting example of type definitions is provided in TABLE 1. A Structure Access Interface handles the creation of new structures and the accessing and setting of values. A Structure Query Interface deals with the retrieval of existing structures.

The Type system provides a classification of entities known to the system, similar to a class hierarchy in object-oriented programming. Types correspond to classes, and features correspond to member variables. Preferably, the Type system interface provides the following functionality: add a new type by providing a name for the new type and specifying the place in the hierarchy where it should be attached; add a new feature by providing a name for the new feature and giving the type that the feature should be attached to, as well as the value type; and query existing types and features, and the relations among them, such as "which type(s) inherit from this type".

Preferably, the Type system provides a small number of built-in types. As was mentioned above, the basic types are int, float and string. In a Java implementation, these correspond to the Java int, float and string types, respectively. Arrays of annotations and basic data types are also supported. The built-in types have special API support in the Structure Access Interface.

The Structure Access Interface permits the creation of new structures, as well as accessing and setting the values of existing structures. Preferably, this provides for creating a new structure of a given type; getting and setting the value of a feature on a given structure; and accessing methods for built-in types. Feature definitions are provided for domains, each feature having a range.

In an alternative environment, modules of FIGS. 1A-1B, 2A-2B can be represented as functional components in GATE (General Architecture for Text Engineering) (see: http://gate.ac.uk/releases/gate-2.0alpha2-build484/doc/user-guide.html). Gate employs components which are reusable software chunks with well-defined interfaces that are conceptually separate from GATE itself. All component sets are user-extensible and together are called CREOLE—a Collection of REusable Objects for Language Engineering. The GATE framework is a backplane into which plug CREOLE components. The user gives the system a list of URLs to search when it starts up, and components at those locations are loaded by the system. In one embodiment, only their configuration data is loaded to begin with; the actual classes are loaded when the user requests the instantiation of a resource.). GATE components are one of three types of specialized Java Beans: 1) Resource: The top-level interface, which describes all components. What all components share in common is that they can be loaded at runtime, and that the set of components is extendable by clients. They have Features, which are represented externally to the system as "meta-data" in a format such as RDF, plain XML, or Java properties. Resources may all be Java beans in one embodiment. 2) ProcessingResource: Is a resource that is runnable, may be invoked remotely (via RMI), and lives in class files. In order to load a PR (Processing Resource) the system knows where to find the class or jar files (which will also include the metadata); 3) LanguageResource: Is a resource that consists of data, accessed via a Java abstraction layer. They live in relational databases; and, VisualResource: Is a visual Java bean, component of GUIs, including of the main GATE gui. Like PRs these components live in .class or .jar files.

In describing the GATE processing model any resource whose primary characteristics are algorithmic, such as parsers, generators and so on, is modelled as a Processing Resource. A PR is a Resource that implements the Java Runnable interface. The GATE Visualisation Model implements resources whose task is to display and edit other resources are modelled as Visual Resources. The Corpus Model in GATE is a Java Set whose members are documents. Both Corpora and Documents are types of Language Resources (LR) with all LRs having a Feature Map (a Java Map) associated with them that stored attribute/value information about the resource. FeatureMaps are also used to associate arbitrary information with ranges of documents (e.g. pieces of text) via an annotation model. Documents have a DocumentContent which is a text at present (future versions may add support for audiovisual content) and one or more AnnotationSets which are Java Sets.

As UIMA, GATE can be used as a basis for implementing natural language dialog systems and multimodal dialog systems having the disclosed question answering system as one of the main submodules. The references, incorporated herein by reference above (U.S. Pat. Nos. 6,829,603 and 6,983,252, and 7,136,909) enable one skilled in the art to build such an implementation.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

In the preferred embodiment the term "user" refers to a person or persons interacting with the system, and the term "user query" refers to a query posed by the user. However other embodiments can be constructed, where the term "user" refers to the computer system generating a query by mechanical means, and where the term "user query" refers to such a mechanically generated query. In this context the "user query" can be a natural language expression, a formal language expression, or a combination of natural language and formal language expressions. The need for automated answering of a computer generated questions arises, for example, in the context of diagnosing failures of mechanical and electronic equipment, where the failing equipment can generate a query on the best way to fix a problem, and such a query could be answered by the system described in this invention based on a relevant corpus of textual data collected from the Internet. Methods of generating automatically natural language expressions from a formal representation have been previously disclosed, for example, in the U.S. Pat. Nos. 5,237,502 and 6,947,885, the contents and disclosures of each of which are incorporated by reference as if fully set forth herein and, can be used by the skilled in the art to create systems for automatically issuing a "user query". Similarly, in such a diagnostic scenario the system can ask an elaboration question, e.g. to query for some additional parameters.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A computer-implemented method of generating answers to questions based on a corpus of data, said method comprising:
    receiving an input query;
    performing a query context analysis upon said input query to break down said input query into query terms, said query terms comprising searchable components;
    conducting a first search in said corpus of data using one of more of said searchable components to obtain documents potentially including candidate answers, wherein all documents potentially including candidate answers are stored in a data storage device;
    analyzing all of said documents and each document's metadata, in a candidate answer generation module, to generate a set of candidate answers;
    conducting a second search in said corpus of data using said candidate answers and said searchable components of said query terms to obtain one or more supporting passages, wherein said supporting passages have at least one of said candidate answers and at least one of said searchable components of said query terms;
    scoring said candidate answers using said supporting passages, wherein said scoring is carried out by a plurality of parallel implemented scoring modules, each scoring module producing a candidate score;
    selecting one or more query answers based on said candidate score;
    generating a query response based on said one or more query answers for delivery to a user,
    wherein each said plurality of parallel implemented scoring modules for scoring all candidate answers using the said supporting passages automatically conducts, in parallel, one or more analyses each producing a candidate score, wherein one candidate score comprises a term match score obtained by implementing executable instructions for counting the number of terms in said supporting passage and determining if said number matches a number of terms in a candidate answer; and,
    wherein a further score comprises a textual alignment score obtained by said processor implementing executable instructions for determining if placement of words in said supporting passages are in alignment with placement of words of said candidate answers; and,
    wherein a further score comprises a deeper analysis score obtained by said processor implementing executable instructions for determining the meaning of the supporting passages and input queries by analyzing lexical or semantic relations.

2. The computer-implemented method as claimed in claim 1, wherein said query context analysis includes determining, from said query, one or more predicate argument structures for each input query.

3. The computer-implemented method as claimed in claim 1, wherein said query context analysis includes determining, from said query, one or more lexical answer types for each input query.

4. The computer-implemented method as claimed in claim 1, further including extending said one or more searchable components using a functionality for term weighting and query expansion.

5. The computer-implemented method as claimed in claim 1, further comprising a candidate answer generation module operating in parallel on said passages retrieved by the said searchable components.

6. The computer-implemented method as claimed in claim 1, wherein said scoring of said candidate answers using said supporting passages by said parallel implemented scoring modules includes automatically conducting, in parallel, one or more analyses each producing said candidate score.

7. The computer-implemented method as claimed in claim 6, wherein one candidate score comprises a term match score obtained by implementing executable instructions for counting the number of terms in said supporting passage and determining if said number matches a number of terms in a candidate answer.

8. The computer-implemented method as claimed in claim 6, wherein a further produced candidate score comprises a textual alignment score obtained by implementing executable instructions for determining if placement of words in said supporting passages are in alignment with placement of words of said candidate answers.

9. The computer-implemented method as claimed in claim 8, wherein said determining if placement of words in said supporting passages are in alignment includes determining whether said words in said supporting passages are one of: a same order, a similar order, or with a similar distance between them.

10. The computer-implemented method as claimed in claim 6, wherein a further produced candidate score comprises a deeper analysis score obtained by implementing executable instructions for determining the meaning of the supporting passages and input queries and computing how well lexical and semantic relations in the candidate answer passages are satisfied.

11. The computer-implemented method as claimed in claim 1, wherein said one or more query answer includes one of: a single query answer, or a ranked list of query answers.

12. The computer-implemented method as claimed in claim 11, wherein the generated query response is one of: the selected query answer or an elaboration question, said elaboration question generated for delivery to a user, said elaboration question requiring user input information in response, and said user input response information being used in said query answer selecting.

13. The computer-implemented method as claimed in claim 11, further comprising, prior to generating said query response, conducting an interactive session with said user and generating, for delivery to said user, one or more elaboration questions, an elaboration question requiring user input information in response, and said input response information being used in answer determining.

14. The computer-implemented method as claimed in claim 11, further comprising: determining if a query answer or ranked list of query answers is above a threshold rank level, and if below said threshold rank level, delivering a query response to a user comprising one or more clarification questions, each clarification question requiring user input information in response, said user input information being added to said query.

15. The computer-implemented method as claimed in claim 11, wherein an input query or said query response or both said input query and query response is provided in accordance with one or more of multiple modalities including text, audio, image, video, tactile or gesture.

16. The computer-implemented method as claimed in claim 11, further comprising:
providing a previously obtained candidate answer ranking function operating on a collection of correctly scored examples by applying machine learning technique to a corpus of scored question answer pairs.

17. The computer-implemented method as claimed in claim 1, wherein said determining a single answer further comprises:
collecting results across all data structures having said scored candidate answers,
normalizing and merging candidate answers produced by a same answer scorer across multiple instances of the candidate answer, and aggregating the results; and,
implementing a candidate answer scoring function to produce a final candidate score.

18. The computer-implemented method as claimed in claim 1, wherein said scoring module implements a candidate answer scoring function performing one of:
context independent scoring where the candidate answer is scored independently of the passage; and,
context dependent scoring where the candidate answer score depends on the passage content.

19. The computer-implemented method as claimed in claim 16, wherein said applying said final candidate answer scoring function to produce said final candidate answer comprises:
applying a logistic regression function or linear regression function to a complete feature set or subset.

20. A system for generating answers to questions based on a corpus of data comprising:
a memory storage device;
a processor in communication with said memory storage device and configured to perform a method comprising:
receiving an input query;
performing a query context analysis upon said input query to break down said input query into query terms, said query terms comprising searchable components;
conducting a first search in said corpus of data using one of more of said searchable components to obtain documents potentially including candidate answers, wherein all documents potentially including candidate answers are stored in a data storage device;
analyzing all of said documents and each document's metadata, in a candidate answer generation module, to generate a set of candidate answers;
conducting a second search in said corpus of data using said candidate answers and said searchable components of said query terms to obtain one or more supporting passages, wherein said supporting passages have at least one of said candidate answers and at least one of said searchable components of said query terms;
scoring said candidate answers using said supporting passages, wherein said scoring is carried out by a plurality of parallel implemented scoring modules, each scoring module producing a candidate score;
selecting one or more query answers based on said candidate score;
generating a query response based on said one or more query answers for delivery to a user,
wherein each said plurality of parallel implemented scoring modules for scoring all candidate answers using the said supporting passages automatically conducts, in parallel, one or more analyses each producing a candidate score, wherein one candidate score comprises a term match score obtained by implementing executable instructions for counting the number of terms in said supporting passage and determining if said number matches a number of terms in a candidate answer; and,
wherein a further score comprises a textual alignment score obtained by said processor implementing executable instructions for determining if placement of words in said supporting passages are in alignment with placement of words of said candidate answers; and,
wherein a further score comprises a deeper analysis score obtained by said processor implementing executable instructions for determining the meaning of the supporting passages and input queries by analyzing lexical or semantic relations.

21. The system as claimed in claim 20, wherein an input query or said query response or both said input query and query response is provided in accordance with one or more of multiple modalities including text, audio, image, video, tactile or gesture.

22. The system as claimed in claim 20, wherein said performing query context analysis includes:
determining, from said query, one or more predicate argument structures for each input query; and,
determining, from said query, one or more lexical answer types for each input query.

23. The system as claimed in claim 20, wherein said performing query context analysis includes generating a first plurality of data structures each comprising said query terms including said searchable components, said processor further configured to perform:
initiating a parallel search for said candidate answers by distributing said first plurality of data structures to enable concurrent search results processing providing said candidate answers.

24. The system as claimed in claim 20, wherein said processor is further configured to
generate a second plurality of data structures each comprising candidate answer sets, said processor further configured to perform:
splitting said candidate answer sets into separate data structures each including one or more candidate answers, and providing said data structures to said plurality of parallel operating means performing concurrent parallel supporting passage retrieval operations.

25. A program storage device readable by a machine, tangibly embodying a program of instructions executable by the machine to perform method steps for generating answers to questions based on a corpus of data, said method steps including the steps of:
receiving an input query;
performing a query context analysis upon said input query to break down said input query into query terms, said query terms comprising searchable components;
conducting a first search in said corpus of data using one of more of said searchable components to obtain documents potentially including candidate answers, wherein all documents potentially including candidate answers are stored in a data storage device;

analyzing all of said documents and each document's metadata, in a candidate answer generation module, to generate a set of candidate answers;

conducting a second search in said corpus of data using said candidate answers and said searchable components of said query terms to obtain one or more supporting passages, wherein said supporting passages have at least one of said candidate answers and at least one of said searchable components of said query terms;

scoring said candidate answers using said supporting passages, wherein said scoring is carried out by a plurality of parallel implemented scoring modules, each scoring module producing a candidate score;

selecting one or more query answers based on said candidate score;

generating a query response based on said one or more query answers for delivery to a user, wherein each said plurality of parallel implemented scoring modules for scoring all candidate answers using the said supporting passages automatically conducts, in parallel, one or more analyses each producing a candidate score, wherein one candidate score comprises a term match score obtained by implementing executable instructions for counting the number of terms in said supporting passage and determining if said number matches a number of terms in a candidate answer; and, wherein a further score comprises a textual alignment score obtained by said processor implementing executable instructions for determining if placement of words in said supporting passages are in alignment with placement of words of said candidate answers; and, wherein a further score comprises a deeper analysis score obtained by said processor implementing executable instructions for determining the meaning of the supporting passages and input queries by analyzing lexical or semantic relations.

* * * * *

UNITED STATES PATENT AND TRADEMARK OFFICE
CERTIFICATE OF CORRECTION

PATENT NO. : 8,275,803 B2  
APPLICATION NO. : 12/152411  
DATED : September 25, 2012  
INVENTOR(S) : Eric W. Brown et al.

Page 1 of 1

It is certified that error appears in the above-identified patent and that said Letters Patent is hereby corrected as shown below:

In the Claims

Column 25, line 27 (claim 1) should read: conducting a first search in said corpus of data using one or Column 27, line 48 (claim 20) should read: conducting a first search in said corpus of data using one or Column 28, line 63 (claim 25) should read: conducting a first search in said corpus of data using one or Signed and Sealed this  
Twenty-eighth Day of May, 2013

Teresa Stanek Rea  
*Acting Director of the United States Patent and Trademark Office*